(12) United States Patent
Cai et al.

(10) Patent No.: US 6,559,205 B2
(45) Date of Patent: May 6, 2003

(54) OXYGEN SCAVENGING POLYMER BLENDS AND EMULSION-BASED METHODS FOR PREPARING SAME

(75) Inventors: Gangfeng Cai, Danville, CA (US); Ta Yen Ching, Novato, CA (US); Hu Yang, San Ramon, CA (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 55 days.

(21) Appl. No.: 09/760,620

(22) Filed: Jan. 16, 2001

(65) Prior Publication Data

US 2002/0095003 A1 Jul. 18, 2002

(51) Int. Cl.⁷ ................................. C08K 3/00
(52) U.S. Cl. ..................................... 523/332
(58) Field of Search ........................ 523/332

(56) References Cited

U.S. PATENT DOCUMENTS

| | | | |
|---|---|---|---|
| 3,497,571 A | 2/1970 | Tellier et al. | 260/844 |
| 4,415,710 A | 11/1983 | Barnabeo et al. | 525/370 |
| 4,524,201 A | 6/1985 | Barnabeo et al. | 528/395 |
| 4,898,912 A * | 2/1990 | Siol et al. | 525/199 |
| 5,021,515 A | 6/1991 | Cochran et al. | 525/371 |
| 5,091,477 A * | 2/1992 | Bueschl et al. | 525/152 |
| 5,116,916 A | 5/1992 | Young | 525/350 |
| 5,153,038 A | 10/1992 | Koyama et al. | 428/35.8 |
| 5,211,875 A | 5/1993 | Speer et al. | 252/188.28 |
| 5,274,024 A | 12/1993 | Koyama et al. | 524/440 |
| 5,281,360 A | 1/1994 | Hong et al. | 252/188.28 |
| 5,310,497 A * | 5/1994 | Ve Speer et al. | 252/188.28 |
| 5,344,869 A * | 9/1994 | Seelert et al. | 525/505 |
| 5,346,644 A | 9/1994 | Speer et al. | 252/188.28 |
| 5,425,896 A | 6/1995 | Speer et al. | 252/188.28 |
| 5,466,756 A | 11/1995 | Roach et al. | 525/330.6 |
| 5,498,364 A | 3/1996 | Speer et al. | 252/188.28 |
| 5,547,765 A | 8/1996 | Degrassi et al. | 428/474.7 |
| 5,605,996 A * | 2/1997 | Chuu et al. | 526/340 |
| 5,627,239 A | 5/1997 | Ching et al. | 525/330.6 |
| 5,641,825 A | 6/1997 | Bacskai et al. | 524/398 |
| 5,656,692 A | 8/1997 | Hayes | 525/63 |
| 5,660,761 A | 8/1997 | Katsumoto et al. | 252/188.28 |
| 5,700,554 A | 12/1997 | Speer et al. | 428/220 |
| 5,707,750 A | 1/1998 | Degrassi et al. | 428/475.8 |
| 5,716,715 A | 2/1998 | Degrassi et al. | 428/475.8 |
| 5,736,616 A | 4/1998 | Ching et al. | 525/330.3 |
| 5,759,653 A | 6/1998 | Collette et al. | 428/35.9 |
| 5,763,095 A | 6/1998 | Ramesh et al. | 428/474.4 |
| 5,776,361 A | 7/1998 | Katsumoto et al. | 252/188.28 |
| 5,837,158 A | 11/1998 | Shepodd et al. | 252/181.6 |
| 5,859,145 A | 1/1999 | Ching et al. | 525/330.6 |
| 5,866,649 A | 2/1999 | Hong et al. | 524/538 |
| 6,057,013 A | 5/2000 | Ching et al. | 428/35.7 |
| 6,063,307 A | 5/2000 | Shepodd et al. | 252/181.6 |
| 6,063,417 A | 5/2000 | Paleari et al. | 426/127 |
| 6,083,585 A * | 7/2000 | Cahill et al. | 428/35.7 |
| 6,333,087 B1 * | 12/2001 | Jerdee et al. | 428/35.9 |
| 6,346,308 B1 * | 2/2002 | Cahill et al. | 428/35.7 |

FOREIGN PATENT DOCUMENTS

| | | |
|---|---|---|
| WO | WO99/48963 | 9/1999 |

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond*, OSP Conference, pp. 1–8 (Chicago, Jun. 19–20, 2000).

Ching et al., "Tasteless Oxygen Scavenging Polymers: A New Platform Technology for Food Packaging Based On Controlled Oxidation," *Oxygen Absorber . . . 2001 and Beyond*, OSP Conference Slides (Chicago, Jun. 19–20, 2000).

* cited by examiner

*Primary Examiner*—Edward J. Cain
(74) *Attorney, Agent, or Firm*—Williams, Morgan & Amerson, P.C.

(57) ABSTRACT

Herein is disclosed a blend of a neat oxygen scavenging polymer and a second polymer. The blend can be prepared by extrusion of a neat formulation of the oxygen scavenging polymer and the second polymer. Also disclosed are methods for preparing the neat formulation of the oxygen scavenging polymer, and packaging articles prepared from the blend. In addition, compositions comprising a branched oxygen scavenging polymer and a second polymer are disclosed, as well as packaging articles prepared from such compositions.

50 Claims, 11 Drawing Sheets

OXYGEN SCAVENGING POLYMER BLENDS AND EMULSION-BASED METHODS FOR PREPARING SAME

BACKGROUND OF THE INVENTION

1. Field of the Invention

The present invention relates generally to the field of oxygen scavenging polymers. More particularly, it concerns blends of oxygen scavenging polymers with other polymers, and especially such blends wherein the oxygen scavenging polymer is branched.

2. Description of Related Art

It is well known that limiting the exposure of oxygen-sensitive products to oxygen maintains and enhances the quality and shelf-life of the product. For instance, by limiting the oxygen exposure of oxygen sensitive food products in a packaging system, the quality of the food product is maintained, and food spoilage is avoided. In addition such packaging also keeps the product in inventory longer, thereby reducing costs incurred from waste and restocking.

A growing technique for limiting oxygen exposure involves incorporating an oxygen scavenger into the packaging structure. The oxygen scavenger is typically a polymer capable of reacting irreversibly with oxygen that also provides adequate structural properties alone or as a blend in an oxygen scavenging layer of a packaging article. Many early approaches involved the use of polymers comprising linear alkenyl moieties, either in the polymer backbone or in groups pendant on the backbone, as oxygen scavengers. However, these approaches often suffered from off-taste and malodor concerns raised by the migration of fragments of the linear alkenyl moieties (generated by the scavenging reaction) into a packaged food or beverage.

A milestone in the development of oxygen scavenging polymers was reached by Ching et al., International Patent Publ. No. WO99/48963, which discloses the use of polymers comprising an ethylenic backbone and cycloalkenyl pendant groups, especially polymers comprising cycloalkenyl methyl acrylate or cycloalkenyl methyl methacrylate units, as oxygen scavenging polymers. The cycloalkenyl pendant groups do not generate fragments upon undergoing the scavenging reaction, and thus impart minimal off-taste and malodor to a packaged food or beverage.

It is often desirable to prepare a neat formulation of an oxygen scavenging polymer. However, the polymers comprising cycloalkenyl methyl (meth)acrylate disclosed by Ching et al. are typically formed by transesterification of acrylates or methacrylates by alcohols comprising the cycloalkenyl methyl moiety in a reactive extrusion process. Although an effective technique, producing an oxygen scavenging polymer via transesterification in a reactive extrusion is often complicated and expensive.

Production of polymers comprising cycloalkenyl methyl (meth)acrylate units by the free-radical-based direct polymerization of cycloalkenyl methyl (meth)acrylate monomers has not been shown. We found that free-radical-based bulk polymerization or solution polymerization of such monomers would lead to excessive crosslinking involving the double bonds of the cycloalkenyl groups. The result would be a polymer mass that would be difficult to process further in the formation of an oxygen scavenging packaging article from the polymer. Also, excessive consumption of the double bonds of the cycloalkenyl groups would lower the oxygen scavenging capacity of the polymer to undesirably low levels. However, it would be desirable to prepare oxygen scavenging polymers that are not excessively crosslinked, as such polymers may have desirable physical properties in certain applications.

Oxygen scavenging polymers made from ethylene-methyl acrylate copolymer via transesterification have a limited amount of oxidizable cyclohexenyl pendant groups due to the typical low conversion of the methyl acrylate monomer unit in the starting polymer to cyclohexenyl methyl acrylate, and therefore may be difficult to blend or dilute with other commercial polymers. Therefore, it is often desirable to prepare blends of oxygen scavenging polymers in order to reduce cost and improve various properties. For example, it is desirable to blend the polymers comprising cycloalkenyl methyl (meth)acrylate disclosed by Ching et al., with other polymers, such as structural polymers or oxygen barrier polymers.

SUMMARY OF THE INVENTION

In one embodiment, the present invention relates to a composition, comprising (i) a branched oxygen scavenging polymer and (ii) a second polymer. Preferably, the oxygen scavenging polymer comprises a cycloalkenyl pendant group, and the second polymer is selected from co(ethylene/methyl acrylate) (EMAC), co(ethylene/vinyl acetate) (EVA), polyethylene (PE), polypropylene (PP), polystyrene (PS), polyethylene terephthalate (PET), polyamides, or co(ethylene/vinyl alcohol) (EVOH).

In another embodiment, the present invention relates to methods of preparing a neat oxygen scavenging polymer. The methods comprise (i) providing an emulsion comprising the oxygen scavenging polymer, water, and a surfactant; (ii) separating the oxygen scavenging polymer from the water, the surfactant, and other compounds that may be present, to yield a separated oxygen scavenging polymer; and (iv) drying the separated oxygen scavenging polymer, to produce the neat oxygen scavenging polymer. The separating step can involve freeze precipitation, solvent precipitation with an organic solvent, acid precipitation with an aqueous dilute strong acid solution, or spray drying. If desired, the oxygen scavenging polymer may be branched.

In a further embodiment, the present invention relates to a method of preparing a composition comprising an oxygen scavenging polymer and a second polymer. Preferably, the oxygen scavenging polymer comprises a cycloalkenyl pendant group, and the second polymer is selected from co(ethylene/methyl acrylate) (EMAC), co(ethylene/vinyl acetate) (EVA), polyethylene (PE), polypropylene (PP), polystyrene (PS), polyethylene terephthalate (PET), polyamides, or co(ethylene/vinyl alcohol) (EVOH). The method comprises (a) providing (i) the oxygen scavenging polymer in neat form and (ii) the second polymer; and (b) blending the oxygen scavenging polymer in neat form and the second polymer, to form the composition. If desired, the oxygen scavenging polymer may be branched.

In one embodiment, the present invention relates to an oxygen scavenging packaging article, comprising an oxygen scavenging layer comprising a branched oxygen scavenging polymer and a second polymer. Preferably, the oxygen scavenging polymer comprises a cycloalkenyl pendant group, and the second polymer is selected from co(ethylene/methyl acrylate) (EMAC), co(ethylene/vinyl acetate) (EVA), polyethylene (PE), polypropylene (PP), polystyrene (PS), polyethylene terephthalate (PET), polyamides, or co(ethylene/vinyl alcohol) (EVOH).

The present invention provides neat formulations of oxygen scavenging polymers. It also provides branched oxygen scavenging polymers that are not excessively crosslinked. In addition, it provides blends of oxygen scavenging polymers with other polymers, such as structural polymers or oxygen barrier polymers, which blends are conveniently prepared.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
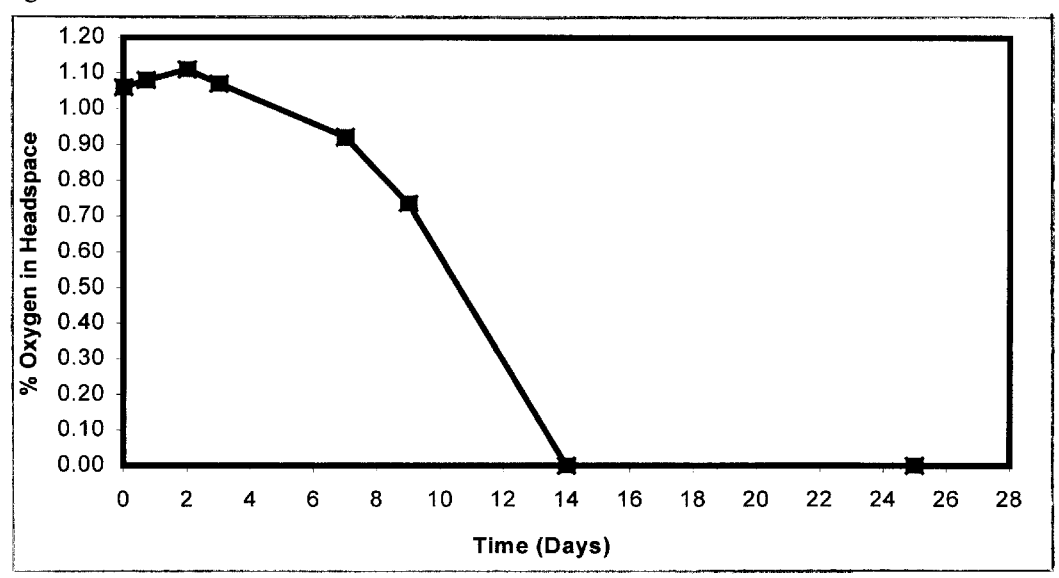
FIG. 1 shows the variation of the head space oxygen level with time for a film described in Example 11 placed in a sealed aluminum bag containing 300 cc nitrogen containing 1% $O_2$. The bag was kept at room temperature (20–28° C.). The head space oxygen level was monitored using a Mocon HS750.

In one embodiment, the present invention relates to a composition, comprising (i) a branched oxygen scavenging polymer and (ii) a second polymer.

By "oxygen scavenging polymer" is meant any polymeric organic compound that irreversibly reacts with oxygen. "Branched" or "crosslinked" refers to a linkage between polymer chains. An oxygen scavenging polymer comprises a hydrocarbon group or groups and a polymeric backbone. The hydrocarbon can be saturated or unsaturated, and substituted or unsubstituted. Examples of oxygen scavenging polymers include, but are not limited to, polymers comprising diene units such as isoprene, butadiene, or styrene-butadiene; oligomers of pentene, octene, and others prepared by olefin metathesis; diene oligomers such as squalene; and units derived from dicyclopentadiene, norbornadiene, 5-ethylidene-2-norbornene, or other monomers containing more than one carbon—carbon double bond (conjugated or non-conjugated). These oxygen scavenging polymers can further comprise carotenoids, such as β-carotene units.

Examples of substituted hydrocarbons include, but are not limited to, those with oxygen-containing moieties, such as esters, carboxylic acids, aldehydes, ethers, ketones, or alcohols. Specific examples of polymers comprising such hydrocarbons include, but are not limited to, those comprising condensation oligomeric segments derived from monomers containing carbon—carbon double bonds; unsaturated fatty acids such as oleic, ricinoleic, dehydrated ricinoleic, and linoleic acids and derivatives thereof, e.g. esters. Such hydrocarbons also include polymers or copolymers derived from allyl (meth)acrylates, or polymers containing nitrogen, such as nylon or MXD6, among others.

Preferably, the branched oxygen scavenging polymer comprises an ethylenic backbone and pendant or terminal cyclic olefinic group with structure I:

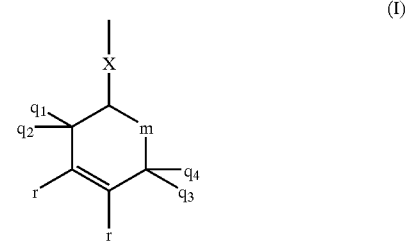

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive; X is null or a linking group; and, when r is hydrogen, at least one of $q_1$, $q_2$, $q_3$, and $q_4$ is also hydrogen. By "X is null" is meant that the carbon of the cyclic olefinic group adjacent to X in structure I is directly bonded to the ethylenic backbone of the polymer.

Preferably, in structure I, n is 1, and $q_1$, $q_2$, $q_3$, $q_4$, and r are each hydrogen.

In structure I, if X is not null, X is a linking group selected from:

—O—(CHR⁴)_y—; —(C=O)—O—(CHR⁴)_y—; —NH—(CHR⁴)_y—; —O—(C=O)—(CHR⁴)_y—; —(C=O)—NH—(CHR⁴)_y—; or —(C=O)—O—CHOH—CH₂—O— wherein $R^4$ is hydrogen, methyl, ethyl, propyl, or butyl; and y is an integer from 1 to 18, inclusive.

The branching of the polymer can occur between side chains, between backbones, or between side chains and backbones. It may involve a reaction involving contaminant monomers present in the polymer. Preferably, the branched polymer comprises structure (II)

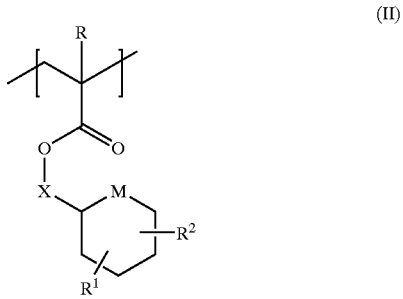

(II)

wherein $R^1$ and $R^2$ are each selected from —H, —CH₃, or a monomeric unit of a polymer wherein the monomeric unit comprises an ethylenic backbone and a cyclic hydrocarbon pendant group, provided at least one of $R^1$ and $R^2$ is the monomeric unit; M is —(CR³₂)_n—, wherein n is an integer from 0 to 4, inclusive; X is null or a linking group; and each $R^3$ is independently selected from —H or —CH₃.

Most preferably, the branched polymer comprises cyclohexenylmethyl acrylate (CHAA) units or cyclohexenylmethyl methacrylate (CHMA) units.

The cyclic olefinic pendant groups provide the benefit of reacting irreversibly with oxygen without the drawback of fragmentation of the pendant group often seen when non-cyclic pendant groups are used.

The branched polymer can be a homopolymer, a copolymer, a terpolymer, or a higher order polymer. If a copolymer, a terpolymer, or a higher order polymer is used, preferably at least about 5 mol % of the units of the branched polymer consist of cyclic olefinic pendant groups having structure I as described above.

Preferably, the mole fraction of crosslinked groups in the branched polymer is less than about 10%, and more preferably is less than about 1%.

The composition also comprises a second polymer. Any second polymer that can be blended with the oxygen scavenging polymer can be used. Preferably, the second polymer is selected from co(ethylene/methyl acrylate) (EMAC), co(ethylene/vinyl acetate) (EVA), polyethylene (PE), polypropylene (PP), polystyrene (PS), polyethylene terephthalate (PET), polyamides, or co(ethylene/vinyl alcohol) (EVOH). Multiple second polymers can be selected, if desired. These polymers are widely known for imparting useful structural, oxygen barrier, or other properties to packaging articles comprising the polymers, and these useful properties are typically retained by compositions comprising at least one of these polymers and the branched polymers described above. Also, these polymers are typically less expensive than oxygen scavenging polymers, and their inclusion in the composition may lead to sufficient oxygen scavenging capacity at lower cost than would be seen for oxygen scavenging polymers alone.

Typically, the composition has a weight ratio of the oxygen scavenging polymer to the second polymer from about 1:99 to about 99:1. More preferably, the weight ratio of the oxygen scavenging polymer to the second polymer is from about 2:98 to about 9:1.

The composition may further comprise other components, depending on the intended use of the composition or the nature of the oxygen scavenging polymer or the second polymer. The other components include those which enhance the storage or usability of the composition or enhance the activity of the oxygen scavenging polymer in an oxygen scavenging application.

In one embodiment, the composition further comprises a compatibilizer. In another embodiment, the composition further comprises a flow agent. Use of a compatibilizer, a flow agent, or both can improve various properties of the blend.

A number of compounds are commonly used with oxygen scavenging polymers, in order to enhance the functionality of the oxygen scavenging polymers in storage, processing into a layer of a packaging article, or use of the packaging article. Such enhancements include, but are not limited to, limiting the rate of oxygen scavenging by the oxygen scavenging polymer prior to filling of the packaging article with a product, initiating oxygen scavenging by the oxygen scavenging polymer at a desired time, limiting the induction period (the period between initiating oxygen scavenging and scavenging of oxygen at a desired rate), or rendering the layer comprising the oxygen scavenging polymer stronger or more transparent, among others. These compounds can be added to the composition, in order to enhance the oxygen scavenging functionality of the oxygen scavenging polymer. Alternatively, depending on their mechanism of action, they can be formed into a layer of a packaging article adjacent to a layer formed from the composition.

The composition or packaging article layer made therefrom or adjacent thereto can further comprise an oxidation catalyst, such as a transition metal. The transition metal functions to catalyze oxygen scavenging by the oxygen scavenging polymer, increasing the rate of scavenging and reducing the induction period. Though not to be bound by theory, useful transition metals include those which can readily interconvert between at least two oxidation states. See Sheldon, R. A.; Kochi, J. K.; "Metal-Catalyzed Oxidations of Organic Compounds" Academic Press, New York 1981.

Preferably, the transition metal is in the form of a salt, with the transition metal selected from the first, second or third transition series of the Periodic Table. Suitable metals include, but are not limited to, manganese, iron, cobalt, nickel, copper, rhodium, and ruthenium. The oxidation state of the metal when introduced need not necessarily be that of the active form. The metal is preferably iron, nickel, manganese, cobalt or copper; more preferably manganese or cobalt; and most preferably cobalt. Suitable counterions for the metal include, but are not limited to, chloride, acetate, oleate, stearate, palmitate, 2-ethylhexanoate, neodecanoate, or naphthenate; preferably, the counterion is selected from $C_1$–$C_{20}$ alkanoates. Preferably, the salt, the transition metal, and the counterion are either on the U.S. Food and Drug Administration GRAS (generally regarded as safe) list, or exhibit substantially no migration from the packaging article to the product (i.e. less than about 500 ppb, preferably less than about 50 ppb, in the product). Particularly preferable salts include cobalt oleate, cobalt stearate, cobalt 2-ethylhexanoate, and cobalt neodecanoate. The metal salt may also be an ionomer, in which case a polymeric counterion is employed. Such ionomers are well known in the art.

Typically, the amount of transition metal may range from 0.001 to 1% (10 to 10,000 ppm) of the composition, based on the metal content only (excluding ligands, counterions, etc.). This applies whether the transition metal is present in the composition or a layer of a packaging article adjacent to a layer formed from the composition.

Another compound that can be added to the composition or an adjacent layer of a packaging article is a photoinitiator, or a blend of different photoinitiators. A photoinitiator is preferred if antioxidants are included in the composition to prevent premature oxidation of the branched oxygen scavenging polymer.

Suitable photoinitiators are well known to those skilled in the art. Specific examples include, but are not limited to, benzophenone, o-methoxybenzophenone, acetophenone, o-methoxy-acetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis(dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, α,α-diethoxyacetophenone, and α,α-dibutoxyacetophenone, among others. Singlet oxygen generating photosensitizers such as Rose Bengal, methylene blue, and tetraphenyl porphine may also be employed as photoinitiators. Polymeric initiators include poly(ethylene carbon monoxide) and oligo [2-hydroxy-2-methyl-1-[4-(1-methylvinyl)phenyl]propanone].

Use of a photoinitiator is preferable because it generally (typically in combination with ultraviolet light) provides faster and more efficient initiation of oxygen scavenging by the branched oxygen scavenging polymer. However, due to the high cost of photoinitiators, it is desirable to use the minimum amount of photoinitiator required to initiate oxygen scavenging. This minimum amount will vary depending on the photoinitiator used, the wavelength and intensity of ultraviolet light used to initiate, whether the photoinitiator is present in the composition, a layer of a packaging article made therefrom, or a layer adjacent to such a layer, and other factors. Preferably, the photoinitiator is either on the U.S. Food and Drug Administration GRAS (generally regarded as safe) list, or exhibits substantially no migration from the composition or the packaging article to the product (i.e. less than 50 ppb in the product).

Photoinitiators that are especially useful in the present invention include benzophenone derivatives containing at least two benzophenone moieties, as described in copending U.S. patent application Ser. No. 08/857,325, filed May 16, 1997, and hereby incorporated herein by reference. These compounds act as effective photoinitiators to initiate oxygen scavenging activity in the composition. Such benzophenone derivatives have a very low degree of extraction from packaging articles, which may lead to reduced malodor or off-taste of a packaged food, beverage, or oral pharmaceutical product by extracted photoinitiator.

A "benzophenone moiety" is a substituted or unsubstituted benzophenone group. Suitable substituents include alkyl, aryl, alkoxy, phenoxy, and alicylic groups contain from 1 to 24 carbon atoms or halides.

The benzophenone derivatives include dimers, trimers, tetramers, and oligomers of benzophenones and substituted benzophenones.

The benzophenone photoinitiators are represented by the formula:

$$A_a(B)_b$$

wherein A is a bridging group selected from sulfur; oxygen; carbonyl; —SiR''$_2$—, wherein each R'' is individually selected from alkyl groups containing from 1 to 12 carbon atoms, aryl groups containing 6 to 12 carbon atoms, or alkoxy groups containing from 1 to 12 carbon atoms; —NR'''—, wherein R''' is an alkyl group containing 1 to 12 carbon atoms, an aryl group containing 6 to 12 carbon atoms, or hydrogen; or an organic group containing from 1 to 50 carbon atoms; a is an integer from 0 to 11; B is a substituted or unsubstituted benzophenone group; and b is an integer from 2 to 12.

The bridging group A can be a divalent group, or a polyvalent group with 3 or more benzophenone moieties. The organic group, when present, can be linear, branched, cyclic (including fused or separate cyclic groups), or an arylene group (which can be a fused or non-fused polyaryl group). The organic group can contain one or more heteroatoms, such as oxygen, nitrogen, phosphorous, silicon, or sulfur, or combinations thereof. Oxygen can be present as, for example, an ether, ketone, aldehyde, ester, or alcohol.

The substituents of B, herein R'', when present, are individually selected from alkyl, aryl, alkoxy, phenoxy, or alicylic groups containing from 1 to 24 carbon atoms, or halides. Each benzophenone moiety can have from 0 to 9 substituents. Substituents can be selected to render the photoinitiator more compatible with the oxygen barrier composition.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), and substituted benzoylated styrene oligomer. Tribenzoyl triphenylbenzene and substituted tribenzoyl triphenylbenzene are especially preferred.

When a photoinitiator is used, its primary function is to enhance and facilitate the initiation of oxygen scavenging by the branched oxygen scavenging polymer upon exposure to radiation. The amount of photoinitiator can vary. In many instances, the amount will depend on the oxygen scavenging polymer used, the wavelength and intensity of UV radiation used, or the nature and amount of antioxidants used, the location of the photoinitiator (in a layer of a packaging article made from the composition or in a layer adjacent thereto), as well as the type of photoinitiator used. The amount of photoinitiator also depends on the intended use of the composition. For instance, if the photoinitiator-containing component is placed underneath a layer which is somewhat opaque to the radiation used, more initiator may be needed. For most purposes, however, the amount of photoinitiator, when used, will be in the range of 0.01 wt % to 10 wt % of the composition.

Antioxidants can be used in the composition, a layer of a packaging article made therefrom, or a layer adjacent to such a layer to control scavenging initiation by the oxygen scavenging polymer. An antioxidant as defined herein is a material which inhibits oxidative degradation or crosslinking of polymers. Typically, antioxidants are added to facilitate the processing of polymeric materials or prolong their useful lifetime. In relation to this invention, such additives prolong the induction period for oxygen scavenging by the branched oxygen scavenging polymer in the absence of irradiation. When it is desired to commence oxygen scavenging by the branched oxygen scavenging polymer, the composition or a packaging article comprising a layer made therefrom is exposed to radiation.

Antioxidants such as 2,6-di(t-butyl)-4-methylphenol (BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, and dilaurylthiodipropionate are suitable for use with this invention.

The amount of an antioxidant which may be present may also have an effect on oxygen scavenging. As mentioned earlier, such materials are usually present to prevent oxidation or gelation of polymers. Typically, they are present in about 0.01 wt % to about 1 wt % of the composition. However, additional amounts of antioxidant may also be added, if desired.

The composition can also comprise at least one structural polymer. The structural polymer imparts useful structural properties, such as rigidity, flexibility, or strength, among others, to the packaging article. Suitable structural polymers include, but are not limited to, polyethylene, low density polyethylene, very low density polyethylene, ultra-low density polyethylene, high density polyethylene, polyvinyl chloride, ethylene-vinyl acetate, ethylene-alkyl (meth) acrylates, ethylene-(meth)acrylic acid, PET, polyamides, polypropylene, or ethylene-(meth)acrylic acid ionomers. Blends of different structural polymers may also be used. However, the selection of the structural polymer largely depends on the end use of the composition.

Other additives which can be included in the composition or a layer of a packaging article made therefrom or adjacent to such a layer include, but are not necessarily limited to, fillers, pigments, dyestuffs, stabilizers, processing aids, plasticizers, fire retardants, and anti-fog agents, among others.

Any other additives employed normally will not comprise more than about 10 wt % of the composition, with preferable amounts being less than about 5 wt % of the composition.

In another embodiment, the present invention relates to a method of preparing a neat oxygen scavenging polymer. In one embodiment, the method comprises (i) providing an emulsion comprising the oxygen scavenging polymer, water, and a surfactant; (ii) combining the emulsion with an organic solvent, to precipitate the oxygen scavenging polymer; (iii) separating the oxygen scavenging polymer from the organic solvent; and (iv) drying the precipitated oxygen scavenging polymer, to produce the neat oxygen scavenging polymer.

The oxygen scavenging polymer may be branched or partially crosslinked, if desired. Preferably, the oxygen scavenging polymer is prepared by emulsion polymerization. Unlike a crosslinked polymer made via bulk polymerization, the oxygen scavenging polymer made from emulsion polymerization, if partially crosslinked, has localized crosslinking sites within the emulsion micelle with polymer particles of colloidal dimensions, i.e. on the order of 0.1 μm in diameter. Therefore, surprisingly, a partially crosslinked oxygen scavenging polymer may be thermally processed or even mixed with various commercial thermoplastics (e.g., ethylene/vinyl alcohol copolymer (EVOH)) to form a clear blend. Also, a non-crosslinked oxygen scavenging polymer prepared by emulsion polymerization may be thermally processed or even mixed with various commercial thermoplastics (e.g., polyethylene, polystyrene, or a mixture thereof) to form a clear blend.

The oxygen scavenging polymer of the emulsion is as described above. By "neat" is meant that the final formulation of the oxygen scavenging polymer consists essentially of the branched oxygen scavenging polymer (with other components being traces of solvents, components of the emulsion, or other compounds which were not removed after reasonable purification attempts). The polymer content of the emulsion can be at any desired level. The upper limit is imposed by the properties of the polymer and the surfactant. There is no lower limit imposed by the properties of the components of the emulsion, but a very low polymer content will make the formation of a solid coating from the emulsion by evaporation of the water therefrom very slow. Preferably, the polymer content of the emulsion is from about 5 wt % to about 65 wt %. More preferably, the polymer content of the emulsion is from about 20 wt % to about 65 wt %. Even more preferably, the polymer content of the emulsion is from about 20 wt % to about 50 wt %.

Depending on the method by which the emulsion is produced, there may be traces of residual monomer. Preferably, the emulsion comprises less than about 0.1 mol % monomer relative to the polymer (i.e. no more than 1 monomer molecule is present for every 1000 monomer units incorporated in the polymer). If the emulsion is intended for use in forming an oxygen scavenging coating of a packaging article, wherein the coating will be in contact with food, it is desirable to limit the monomer content of the emulsion to low levels (e.g. less than about 30 ppm).

The surfactant can be any surfactant which allows formation of the emulsion and does not greatly diminish the oxygen scavenging properties of the oxygen scavenging polymer after the emulsion is applied to a surface and the water evaporated from the emulsion to form a polymer coating. Also, if the emulsion is intended for use in forming an oxygen scavenging coating of a packaging article, wherein the coating will be in contact with food, the surfactant should be acceptable in this use.

In one preferred embodiment, the surfactant is an ionic surfactant. More preferably, the ionic surfactant is sodium lauryl sulfate. In another preferred embodiment, the surfactant is a nonionic surfactant. More preferably, the nonionic surfactant is nonyl phenol ethoxylate or an alkylarylpolyether sulfonate (such as the active ingredient in Triton X-200, commercially available from Union Carbide).

Preferably, the surfactant content of the emulsion is from about 0.1 wt % to about 1.5 wt % active surfactant.

Preferably, the water of the emulsion is deionized, distilled, or both.

The emulsion can further comprise other components. The other components include those which enhance the storage or usability of the emulsion or enhance the activity of the oxygen scavenging polymer after the emulsion is applied to a surface and water evaporated therefrom. One such component may be an initiator product. An "initiator product," as used herein, is a product formed by the breakdown of a water soluble free radical initiator used to initiate the polymerization of emulsified monomer. Preferably, the free radical initiator comprises $K_2S_2O_8$ or $(NH_4)_2S_2O_8$, i.e., the initiator product is $K_2SO_4$ or $(NH_4)_2SO_4$. The concentration of initiator product is preferably less than about 0.5 wt %.

Preferably, the emulsion as provided is substantially free of (i.e., comprises less than about 1%) organic solvent.

One method for preparing the emulsion comprises (i) providing water, the surfactant, monomeric components of the oxygen scavenging polymer, and a free radical initiator; (ii) forming an emulsion comprising water, the surfactant, and the free radical initiator, to form a first emulsion; (iii) adding the monomeric components to the first emulsion, and (iv) polymerizing the monomeric components, to form the oxygen scavenging polymer emulsion.

The water and the surfactant are as described above.

The free radical initiator can be any compound known to provide free radicals in aqueous emulsion. Preferably, the free radical initiator is potassium persulfate or ammonium persulfate. The concentration of the free radical initiator is preferably less than about 0.5 w/v %.

The first emulsion can optionally comprise a free radical chain transfer agent. If used, the free radical chain transfer agent provides additional control of molecular weight and crosslinking density of the oxygen scavenging polymer.

The oxygen scavenging polymer is as described above. The definition of "monomeric components" differs slightly depending on whether the oxygen scavenging polymer is a homopolymer or a copolymer, terpolymer, or higher order polymer. If the oxygen scavenging polymer is a homopolymer, "monomeric components" refers to a plurality of identical monomer molecules that, upon polymerization, form the homopolymer. For example, if the oxygen scavenging polymer is poly(cyclohexenyl methyl acrylate), the monomeric components are a plurality of cyclohexenyl methyl acrylate monomer molecules.

If the oxygen scavenging polymer is a copolymer, terpolymer, or higher order polymer, "monomeric components" refers to a plurality of first monomer molecules, a plurality of second monomer molecules, etc. For example, if the oxygen scavenging polymer is cyclohexenyl methyl acrylate/cyclohexenyl methyl methacrylate copolymer, the monomeric components are a plurality of cyclohexenyl methyl acrylate monomer molecules and a plurality of cyclohexenyl methyl methacrylate monomer molecules.

The first emulsion comprising water, the surfactant, and the free radical initiator can be prepared by adding the surfactant and the free radical initiator to the water in any order. Preferably, the order of addition is the surfactant first, the free radical initiator second. The concentration of each ingredient added to the first emulsion is preferably such that the concentration in the final emulsion will be in the ranges discussed above. During or soon after addition of the surfactant and the free radical initiator, the ingredients are agitated by any appropriate technique (e.g., stir bar, paddle rotor, sonication, etc.) to form the first emulsion.

After the first emulsion has been formed, monomeric components are added thereto and polymerization of the monomeric components is performed. Typically, the reactor containing the first emulsion is heated to a temperature from about 60° C. to about 100° C., preferably about 70° C., under a nitrogen atmosphere with constant stirring. The monomeric components (including any comonomeric components desired) are added thereto, either as a substantially pure feed or in a second emulsion similar to the first emulsion but with the further inclusion of the monomeric components. The substantially pure monomeric components or the second emulsion containing monomeric components is charged to the reactor sufficiently slowly to keep the temperature of the reactor below about 100° C., preferably below about 80° C.

One unexpected result of this method, when operated on monomeric components comprising cycloalkenyl pendant groups, is that a small degree of crosslinking may occur between cycloalkenyl groups of the nascent polymer chains. Further, crosslinking may occur between polymerizable, cross-linkable monomeric components incorporated into the nascent polymer chains. Preferably, if branched, the branched (or lightly crosslinked) polymer comprises structure II. However, by "branched" or "lightly crosslinked" is meant that the degree of crosslinking is sufficiently low (typically less than about 10 mol % cycloalkenyl moieties) that the oxygen scavenging properties of the polymer are not impaired.

After a sufficient length of time has elapsed for the reaction to go substantially to completion (preferably in the range of about 30 min to about 6 hr, more preferably about 2 hr), the temperature can be raised briefly (such as from about 10 min to about 20 min, preferably about 15 min) to at least about 90–100° C. to polymerize any residual monomeric components that may remain in the solution. Thereafter, the emulsion can be cooled with stirring to room temperature for storage or use.

The resulting emulsion is readily pourable and is stable for a period of at least several months.

After the desired emulsion is provided, the emulsion is contacted with an organic solvent, to precipitate the branched oxygen scavenging polymer.

Any organic solvent which can precipitate the oxygen scavenging polymer may be used. In one preferred embodiment, the organic solvent is isopropanol.

The ratio of emulsion to organic solvent may be any ratio at which precipitation of the branched oxygen scavenging polymer can be achieved. This ratio may vary depending on the polymer content of the emulsion, the organic solvent used, and other variables. Preferably, the weight ratio of emulsion to organic solvent is between about 1:9 to 9:1.

The contacting step by adding the emulsion to the organic solvent or vice versa. Preferably, the addition occurs under agitation to intimately contact the emulsion and the organic solvent. Agitation can be performed by any appropriate technique, for example, stir bar, paddle rotor, or sonication, among others.

During the performance of the contacting step, the oxygen scavenging polymer precipitates. After precipitation, the oxygen scavenging polymer is separated from the mixture of the aqueous solution and the organic solvent. Separation can be performed by any appropriate technique. Typically, the precipitated polymer is subjected to filtration and washes with water and/or organic solvents such as isopropanol or methanol.

The result of the separation step is typically a substantially pure precipitated polymer containing a low level of residual solvent, either water, an organic solvent described above, or both. Thereafter, the substantially pure precipitated polymer is dried to remove the residual solvent. Drying can involve any conditions that remove residual solvent without substantially impairing the yield or physical properties of the polymer. Typically, drying involves applying relatively gentle heat (e.g. from about 30° C. to about 50° C., preferably about 40° C.) under a vacuum or a partial vacuum to the substantially pure polymer. A low-level nitrogen feed can be applied to further minimize the amount of air present in the oven. The result of the drying step is a neat formulation of the oxygen scavenging polymer.

In another embodiment, the present invention relates to another method of preparing a neat oxygen scavenging polymer, comprising (i) providing an emulsion comprising the oxygen scavenging polymer, water, and a surfactant; (ii) cooling the emulsion to less than about 0° C., to precipitate the oxygen scavenging polymer; (iii) separating the precipitated oxygen scavenging polymer from the emulsion; and (iv) drying the precipitated oxygen scavenging polymer, to produce the neat oxygen scavenging polymer.

The emulsion is as described above.

The cooling step can be performed by any known technique using any appropriate apparatus. The temperature to which the emulsion is cooled can be any temperature less than about 0° C., preferably between about −10° C. and about −5° C. The cooling step is believed to disrupt the emulsion and thus lead to precipitation of the oxygen scavenging polymer. To prevent solidification of the emulsion below the freezing point, a salt, such as sodium chloride, may be added.

After precipitation of the polymer, the precipitated polymer is separated from the solvent and dried as described above. Preferably, if the separating step involves washes of the precipitated polymer, the washing agent is water, in order to minimize the presence of organic solvents in the neat polymer produced at the end of the drying step.

In yet another embodiment, the present invention relates to a method of preparing a neat oxygen scavenging polymer, comprising (i) providing an emulsion comprising the oxygen scavenging polymer, water, and a surfactant; (ii) contacting the emulsion with an aqueous dilute strong acid solution, to precipitate the oxygen scavenging polymer; (iii) separating the precipitated oxygen scavenging polymer from the solution; and (iv) drying the precipitated oxygen scavenging polymer, to produce the neat oxygen scavenging polymer.

The emulsion is as described above.

The "aqueous dilute strong acid solution" used in the contacting step can be any dilute solution of a strong acid in water. By "strong acid" is meant an inorganic acid whose pKa is less than about 2. Examples of strong acids include HF, HCl, $HNO_3$, or $H_2SO_4$. By "dilute solution" is meant a solution comprising less than about 5 wt % of the strong acid. Preferably, the solution comprises between about 1 wt % and about 2 wt % strong acid.

The ratio of emulsion to aqueous dilute strong acid solution may be any ratio at which precipitation of the oxygen scavenging polymer can be achieved. This ratio may vary depending on the polymer content of the emulsion, the strong acid used, the dilution of the strong acid, and other variables. Preferably, the weight ratio of emulsion to dilute strong acid solution is between about 1:5 to 5:1.

The contacting step is performed by adding the emulsion to the aqueous dilute strong acid solution, or vice versa. Preferably, the addition occurs under agitation to intimately contact the emulsion and the acid solution. Agitation can be performed by any appropriate technique, for example, stir bar, paddle rotor, or sonication, among others.

During the performance of the contacting step, the oxygen scavenging polymer precipitates. Thereafter, the precipitated polymer is separated from the solvent and dried as described above. Preferably, if the separating step involves washes of the precipitated polymer, the washing agent is water, in order to minimize the presence of organic solvents in the neat polymer produced at the end of the drying step.

In still a further embodiment, the present invention relates to a method of preparing a neat oxygen scavenging polymer, comprising (i) providing an emulsion comprising the oxygen scavenging polymer, water, and a surfactant; and (ii) spray-drying the oxygen scavenging polymer under vacuum at a temperature between about 80° C. and about 100° C., to produce the neat oxygen scavenging polymer.

The emulsion is as described above.

The spray-drying step can be performed using any appropriate apparatus and technique. Typically, the emulsion is spray dried in a spray dryer. The result of the spray-drying step is a neat formulation of the oxygen scavenging polymer.

In all of the methods described above for preparing a neat oxygen scavenging polymer, the method can further comprise extruding the neat oxygen scavenging polymer. Extrusion typically involves melting the neat polymer, extruding the polymer melt, pelletizing the polymer melt, and cooling the pelletized polymer melt to produce pellets of the oxygen scavenging polymer. Techniques and apparatus for performing extrusion are well known in the art.

We have observed that, presumably because the oxygen scavenging polymer described above is made via emulsion polymerization, the polymer is thermally processible even if it is partially crosslinked.

In another embodiment, the present invention relates to a method of preparing a composition comprising a neat oxygen scavenging polymer and a second polymer, the method comprising (a) providing (i) the oxygen scavenging polymer in neat form and (ii) the second polymer; and (b) blending the oxygen scavenging polymer in neat form and the second polymer, to form the composition. The composition may be referred to as a "blend."

The oxygen scavenging polymer and the second polymer are as described above. The neat formulation of the oxygen scavenging polymer can be prepared according to any of the methods described above, or by other methods known to one of ordinary skill in the art. The second polymer can be prepared according to any method known in the art or purchased from a known supplier.

The blending step can involve any appropriate techniques and apparatus. Preferably, the blending occurs by melting the neat oxygen scavenging polymer and the second polymer at from about 160° C. to about 280° C. Such melting is conveniently part of an extrusion process, wherein the blending further comprises extruding the oxygen scavenging polymer and the second polymer after melting. As described above, after extrusion, the blended oxygen scavenging polymer and second polymer are typically pelletized and cooled, to form pellets of the blend.

Also, if desired, the blend can further comprise other components, such as a transition metal oxidation catalyst or catalysts, an antioxidant or antioxidants, or a photoinitiator or photoinitiators, among others.

The blend can be stored for a relatively long time, on the order of weeks or months, preferably under a low oxygen atmosphere, or the blend can be used directly after being made. The blend is especially useful for preparing an oxygen scavenging layer of an oxygen scavenging packaging article.

In one embodiment, the present invention relates to an oxygen scavenging packaging article, comprising an oxygen scavenging layer comprising a branched oxygen scavenging polymer and a second polymer.

Packaging articles typically come in several forms, including a single layer flexible article, a multilayer flexible article, a single layer rigid article, or a multilayer rigid article. Typical packaging articles include plastic, glass, paper, or cardboard cartons or bottles such as juice containers, soft drink containers, beer bottles, wine bottles, thermoformed trays, or cups, which generally have wall thicknesses in the range of 100 to 1000 micrometers. Typical flexible articles include those used to package many food items, and typically have a thickness of 5 to 250 micrometers. The walls of such articles either comprise single or multiple layers of material.

The branched polymer and the second polymer are as described above. The branched oxygen scavenging polymer can be prepared according to any of the methods described above, or by other methods known to one of ordinary skill in the art. The second polymer can be prepared according to any method known in the art or purchased from a known supplier.

The oxygen scavenging layer comprising the oxygen scavenging polymer and the second polymer may also comprise other compounds as described above, such as a transition metal catalyst, a photoinitiator, or an antioxidant, among others. Alternatively, the packaging article may comprise certain additives, such as a transition metal catalyst or a photoinitiator, in a layer adjacent to the oxygen scavenging layer.

The oxygen scavenging packaging article can be used to package any type of product for which it is desirable to inhibit oxygen damage during storage, e.g. food, beverages, pharmaceuticals, medical products, cosmetics, corrodible metals, or electronic devices.

The packaging article can comprise a single oxygen scavenging layer or an oxygen scavenging layer and an additional layer or layers. The additional layers which can be used include an oxygen barrier layer, an alternate oxygen scavenging layer (i.e. an oxygen scavenging layer not comprising a branched oxygen scavenging polymer, not comprising a second polymer, or not comprising both), a food-contact layer, a structural layer, or an adhesive layer, alone or in any combination. Single layered packaging articles can be prepared by solvent casting, injection molding, blow molding, or by extrusion, among other techniques. Packaging articles with multiple layers are typically prepared using coextrusion, injection molding, blow molding, coating, or lamination, among other techniques.

If the packaging article comprises a structural layer or layers, the structural layer or layers comprise a structural material, such as a structural polymer, that imparts useful structural properties, such as rigidity, flexibility, or strength, among others, to the packaging article. Suitable structural polymers include, but are not limited to, polyethylene, low density polyethylene, very low density polyethylene, ultra-low density polyethylene, high density polyethylene, polyvinyl chloride, ethylene-vinyl acetate, ethylene-alkyl (meth) acrylates, ethylene-(meth)acrylic acid, PET, polyamides, polypropylene, or ethylene-(meth)acrylic acid ionomers. Other components that can be used in the structural layer include paperboard or cardboard. Blends of different structural polymers or components may also be used. However, the selection of the structural polymer or component largely depends on the article to be manufactured and the end use thereof. Such selection factors are well known in the art.

Preferably, the structural polymer is selected from PET, polyamides, polypropylene, polyethylene, low density polyethylene, very low density polyethylene, ultra-low density polyethylene, high density polyethylene, polyvinyl chloride, ethylene-vinyl acetate, ethylene-alkyl (meth) acrylates, ethylene-(meth)acrylic acid, or ethylene-(meth) acrylic acid ionomers. If the packaging article is a rigid carton, such as a juice carton, the structural layer preferably comprises paperboard or cardboard. If the packaging article is a bottle, the structural layer preferably comprises PET.

Optionally, the packaging article comprises an oxygen barrier layer. The oxygen barrier layer comprises an oxygen barrier material, e.g. a 1 mil layer consisting essentially of the material has an oxygen transmission rate of less than about 100 $cc/m^2$/day at room temperature under 1 atm $O_2$. Preferably, the oxygen barrier material is selected from vinyl alcohol polymers, polyesters, vinylidene dichloride polymers, epoxy polymers, sulfone polymers, acrylonitrile polymers, isocyanate polymers, polyamides, silica, or metal foil.

In one preferred embodiment, the oxygen barrier material is poly(ethylene/vinyl alcohol) (EVOH). In still another preferred embodiment, the oxygen barrier material is polyacrylonitrile (PAN). In a further preferred embodiment, the oxygen barrier material is poly(vinylidene dichloride) (PVDC). In yet an additional preferred embodiment, the oxygen barrier material is a polyester (such as polyethylene terephthalate (PET) or polyethylene napthalate (PEN)). In still an additional preferred embodiment, the oxygen barrier material is a polyamide. Preferred polyamides include nylon 6 and nylon 6,6.

Two or more oxygen barrier materials can be used, either as a blend of homopolymers or a copolymer of two or more materials, or, if one of the oxygen barrier materials is metal foil, additional polymer oxygen barrier materials can be applied as coatings onto the foil. The appropriateness of a particular oxygen barrier material may vary depending on the intended use of the packaging article and other parameters. However, because the second polymer of the composition of the present invention can be selected from several oxygen barrier polymers, the need for a separate oxygen barrier layer may be reduced or dispensed with entirely.

Optionally, the packaging article may further comprise an oxygen scavenging layer not comprising a branched oxygen scavenging polymer. Exemplary non-branched oxygen scavenging polymers that can be used in such a layer are described in Ching et al., International Patent Publ. No. WO99/48963. Further components, such as a transition metal catalyst or catalysts, a photoinitiator or photoinitiators, or an antioxidant or antioxidants, among others, can be included in such an oxygen scavenging layer or a layer adjacent thereto, as desired.

Other additional layers of a multilayer packaging article may include one or more layers permeable to oxygen. In one packaging article, preferred for flexible packaging of food and scavenging of oxygen found in the packaged food, the layers include, in order starting from the outside of the package to the innermost layer of the package, (i) an optional oxygen barrier layer, (ii) an oxygen scavenging layer comprising a blend of a branched oxygen scavenging polymer and a second polymer, and (iii) an optional oxygen-permeable layer. Control of the oxygen barrier property of (i) limits the rate of oxygen entry to the oxygen scavenging moieties in layer (ii), and thus slows the consumption of oxygen scavenging capacity by atmospheric oxygen. Control of the oxygen permeability of layer (iii) impacts the rate of oxygen scavenging for the overall structure. Furthermore, layer (iii) can provide a barrier to migration of the components of the outer layers, or by-products of the reaction of such components with oxygen or other reactants, into the package interior. Even further, layer (iii) can improve the heat-sealability, clarity, or resistance to blocking of the multilayer packaging article.

Further additional layers, such as adhesive layers, may also be used in a multilayer packaging article. Compositions commonly used for adhesive layers include anhydride functional polyolefins and other well-known adhesive layers.

The packaging article can be formed following any appropriate technique, depending on the oxygen scavenging composition, the packaging article, and other parameters. As mentioned above, single layered packaging articles are typically prepared by solvent casting, injection molding, blow molding, injection blow molding, or extrusion, among others. Packaging articles with multiple layers are typically prepared using coextrusion, injection molding, blow molding, injection blow molding, coating, or lamination, among others.

If a transition metal catalyst is desired for inclusion in the packaging article, to catalyze oxygen scavenging by the oxygen scavenging layer, the forming step may comprise forming a transition metal catalyst into the oxygen scavenging layer or a layer adjacent to the oxygen scavenging layer.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

Preparation of Cyclohexenylmethyl Acrylate/Methyl Acrylate (CHAA/MA) Emulsion Copolymer A 2-L 4-neck flask fitted with a mechanical stirrer, a thermometer, a reflux condenser, nitrogen sparge, and two additional funnels was charged with 476 g deionized water, 32 g Polystep B-5 (product of Stepan Corp., containing 28–30 wt % sodium lauryl sulfate), and 1 g potassium persulfate. With constant stirring, the solution was warmed to 70° C. Then, 218 g CHAA was mixed with 218 g methyl acrylate, and poured into one of the additional funnels. At that point, 45 g deionized water was mixed with 2 g potassium persulfate and poured into the other additional funnel. About 20% of the monomer mixture was added quickly into the reaction flask and allowed to react. When the exotherm subsided, addition of the remaining monomer mixture and the initiator solution began. Both the monomer mixture and initiator solution were added separately and concurrently over a period of 1–2 hr (depending on the actual scale). The reaction mixture was maintained at 70–75° C. during the reaction, and for 1–2 hr after completion of the feeds. The emulsion product was cooled and discharged. This emulsion contained 43.7% CHAA/MA copolymer solid.

Example 2

Preparation of CHAA/MA Emulsion Copolymer

A monomer emulsion was prepared by mixing 20 kg deionized water, 1.4 kg Polystep B-5, 80 g potassium persulfate, 18 kg CHAA, and 18 kg methyl acrylate in four 5-gallon cans. A 30-gallon batch reactor equipped with a nitrogen sparge, a short reflux column, and one liquid feeder was charged with 22 kg deionized water, 0.8 kg Polystep B-5, and 80 g potassium persulfate. The mixture was heated to 70° C. under nitrogen. About 10 kg monomer emulsion was charged to the 30-gal reactor after the mixture reached 70° C. and allowed to react. When the exotherm subsided, addition of the remaining monomer emulsion mixture was begun. The addition rate was controlled to keep the reaction mixture at 70–75° C. The reaction mixture was maintained at 70–75° C. for 2 hr after completion of the monomer emulsion feed. The emulsion product was cooled and discharged. This emulsion contained 44.8% CHAA/MA copolymer solid.

Example 3

Preparation of CHAA/Cyclohexenylmethyl Methacrylate (CHMA) Emulsion Copolymer

A 2-L 4-neck flask fitted with a mechanical stirrer, a thermometer, a reflux condenser, nitrogen sparge, and two additional funnels was charged with 476 g deionized water, 32 g Polystep B-5, and 1 g potassium persulfate. With constant stirring, the solution was warmed to 70° C. Then, 218 g CHAA was mixed with 218 g CHMA, and poured into one of the additional funnels. At that time, 45 g deionized water was mixed with 2 g potassium persulfate and poured into the other additional funnel. About 20% of the monomer mixture was added quickly into the reaction flask and allowed to react. When the exotherm subsided, addition of the remaining monomer mixture and the initiator solution was begun. Both the monomer mixture and initiator solution were added separately and concurrently over a period of 1–2 hr (depending on the actual scale). The reaction mixture was maintained at 70–75° C. during the reaction, and for 1–2 hr after completion of the feeds. The emulsion product was cooled and discharged. This emulsion contained 43.7% CHAA/CHMA copolymer solid.

Example 4

Preparation of Neat CHAA-Based Oxygen Scavenging Polymer from Emulsion, Solvent Precipitation First, 800 mL isopropanol was poured into a 2-L beaker. With vigorous agitation, 800 g CHAA-based polymer emulsion made according to any one of Examples 1–3 was slowly poured into the beaker. The precipitated polymer was filtered and washed with 2×100 mL isopropanol, 500 mL deionized water, and then 2×100 ML methanol. The polymer was dried in a vacuum oven at about 40° C. with very slow nitrogen bleed through the oven to ensure no air was present. The dried polymer was stored at room temperature in a sealed aluminum foil bag.

Example 5

Preparation of Neat CHAA-Based Oxygen Scavenging Polymer from Emulsion, Freeze Precipitation A CHAA-based polymer emulsion made according to any one of Examples 1–3 was cooled to −5° C. to −10° C. and then warmed to room temperature. The precipitated polymer was filtered and washed with deionized water several times. The polymer was dried in a vacuum oven at about 40° C. with very slow nitrogen bleed through the oven to ensure no air was present. The dried polymer was stored at room temperature in a sealed aluminum foil bag.

Example 6

Preparation of Neat CHAA-Based Oxygen Scavenging Polymer from Emulsion, Precipitation through Acidification First, 17 g $H_2SO_4$ (98%) was poured into 800 mL deionized water in a 2-L beaker. With vigorous agitation, 800 g CHAA-based polymer emulsion made according to any one of Examples 1–3 was slowly poured into the beaker. The precipitated polymer was filtered and washed with deionized water several times. The polymer was dried in a vacuum oven at about 40° C. with very slow nitrogen bleed through the oven to ensure no air was present. The dried polymer was stored at room temperature in a sealed aluminum foil bag.

Example 7

Preparation of Neat CHAA-Based Oxygen Scavenging Polymer from Emulsion, Spray Dry Process A CHAA-based polymer emulsion made according to any one of Examples 1–3 is spray dried in a spray dryer at 80–100° C. under vacuum. The polymer collected at the bottom of the spray dried is extruded and pelletized. The dried polymer is stored at room temperature in a sealed aluminum foil bag.

Example 8

Preparation of EMAC-Based Oxygen Scavenging Polymer Blend from Neat Polymer

One part by weight neat CHAA-based oxygen scavenging polymer made according to any one of Examples 4–6 was blended with 2 parts by weight EMAC-2260 (ethylene/methyl acrylate copolymer, 23.5 wt % methyl acrylate, commercially available from Eastman Chemical) on a twin screw Haake extruder at 160–170° C. The blend was stored at room temperature in a sealed aluminum bag.

Example 9

Preparation of Polyethylene-Based Oxygen Scavenging Polymer Blend from Neat Polymer One part by weight neat CHAA-based oxygen scavenging polymer made according to any one of Examples 4–6 was blended with 2 parts by weight commercial film grade polyethylene on a twin screw Haake extruder at 160–170° C. The blend was stored at room temperature in a sealed aluminum bag.

Example 10

Preparation of Polyethylene Terephthalate-Based Oxygen Scavenging Polymer Blend from Neat Polymer Five parts by weight neat CHAA-based oxygen scavenging polymer made according to any one of Examples 4–6 was blended with 95 parts by weight commercial bottle grade PET on a twin screw ZSK-30 extruder at 260–280° C. The blend was tumble dried at 120° C. for 4 hr and stored at room temperature in a sealed aluminum bag.

Example 11

Oxygen Scavenging Study of a Single Layer Film made from EMAC-based Oxygen Scavenging Polymer Blend An EMAC-based oxygen scavenging blend was made with 2 parts by weight EMAC-2260 and 1 part by weight neat CHAA/CHMA (weight ratio=50/50) copolymer on a twin screw Haake extruder at 170° C. Thereafter, 90 parts by weight blend was further blended, on a Haake at 170° C., with 10 parts by weight EMAC-based cobalt masterbatch containing 1 wt % of tribenzoyl triphenylbenzene (BBP$^3$) and 1 wt % of cobalt as cobalt oleate. The blend was made into 2 mil thick monolayer film on a Randcastle film extruder at 170° C. A film sized 5 cm×20 cm (mass=0.428 g) was put in a sealed aluminum bag containing 300 cc of nitrogen containing 1% 02. The bag was kept at room temperature (20–28° C.). The head space oxygen level was monitored using a Mocon HS750. FIG. 1 shows the variation of the head space oxygen level with time.

Example 12

Figure 2:
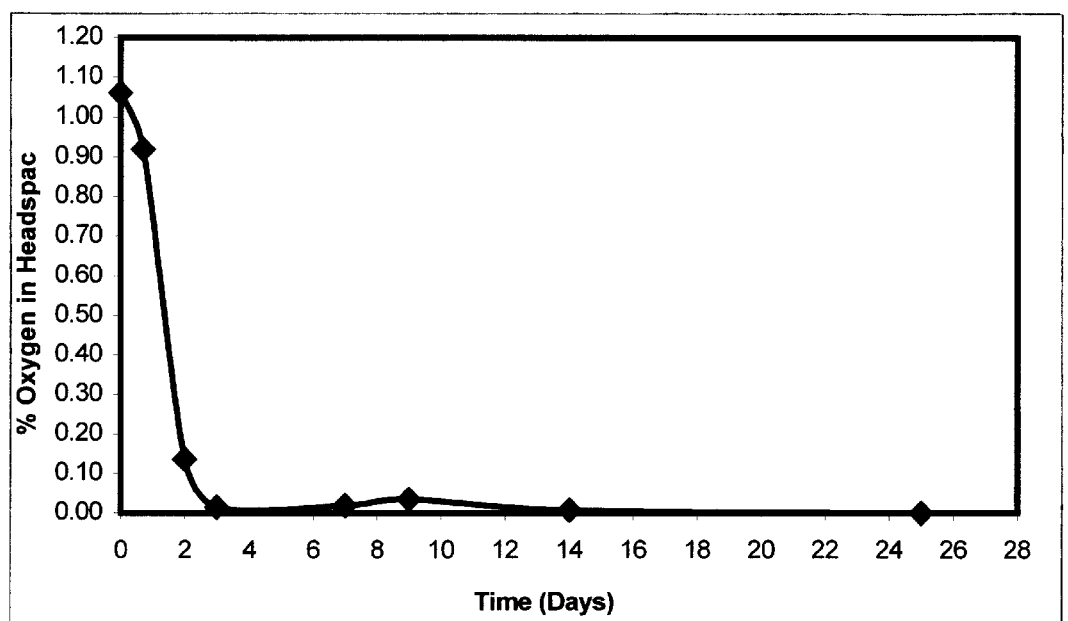
FIG. 2 shows the variation of the head space oxygen level with time for a film described in Example 12 placed in a sealed aluminum bag containing 300 cc nitrogen containing 1% $O_2$. The bag was kept at room temperature (20–28° C.). The head space oxygen level was monitored using a Mocon HS750.

Oxygen Scavenging Study of Single Layer Film Made from EMAC-Based Oxygen Scavenging Polymer Blend A film as used in Example 11 with a size of 5 cm×20 cm (mass 0.420 g) was exposed to ultraviolet light of peak wavelength 254 nm for 100 sec, and then put in a sealed aluminum bag containing 300 cc of nitrogen containing 1% $O_2$. The bag was kept at room temperature (20–28° C.). The head space oxygen level was monitored using a Mocon HS750. FIG. 2 shows the variation of the head space oxygen level with time.

Example 13

Figure 3:
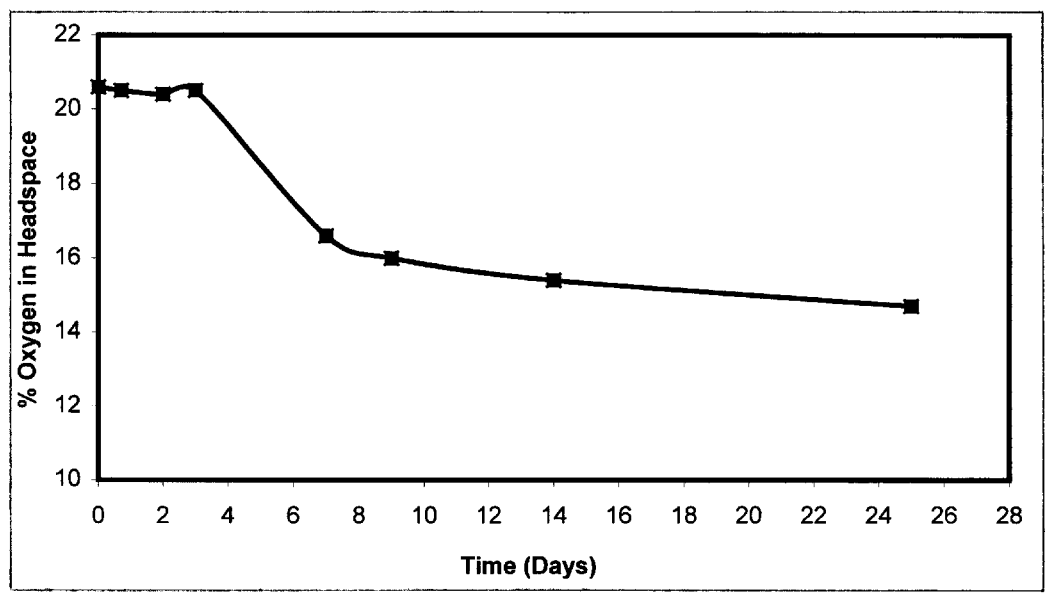
FIG. 3 shows the variation of the head space oxygen level with time for a film described in Example 13 placed in a sealed aluminum bag containing 300 cc air. The bag was kept at room temperature (20–28° C.). The head space oxygen level was monitored using a Mocon HS750.

Oxygen Scavenging Study of Single Layer Film Made from EMAC-Based Oxygen Scavenging Polymer Blend A film as used in Example 11 with a size of 5 cm×20 cm (mass=0.434 g) was put in a sealed aluminum bag containing 300 cc air. The bag was kept at room temperature (20–28° C.). The head space oxygen level was monitored using a Mocon HS750. FIG. 3 shows the variation of the head space oxygen level with time.

Example 14

Figure 4:
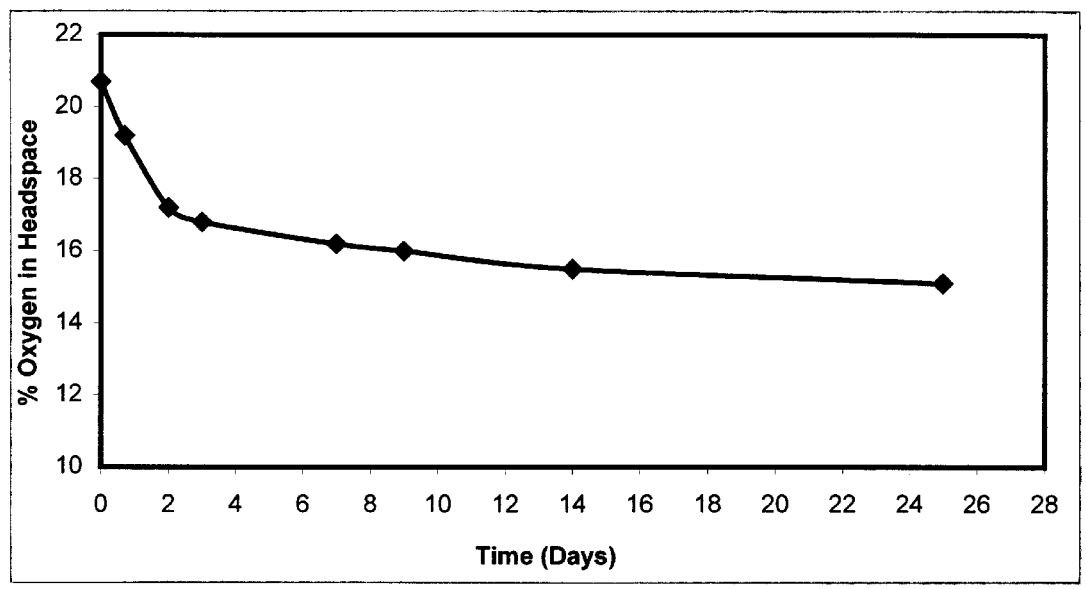
FIG. 4 shows the variation of the head space oxygen level with time for a film described in Example 14 placed in a sealed aluminum bag containing 300 cc air. The bag was kept at room temperature (20–28° C.). The head space oxygen level was monitored using a Mocon HS750.

Oxygen Scavenging Study of Single Layer Film Made from EMAC-Based Oxygen Scavenging Polymer Blend A film as in Example 11 with a size of 5 cm×20 cm (mass=0.448 g) was exposed to ultraviolet light with a peak wavelength of 254 nm for 100 sec, and then put in a sealed aluminum bag containing 300 cc air. The bag was kept at room temperature (20–28° C.). The head space oxygen level was monitored using a Mocon HS750. FIG. 4 shows the variation of the head space oxygen level with time.

Example 15

Oxygen Scavenging Study of Single Layer Film Made from PET-Based Oxygen Scavenging Polymer Blend A PET-based oxygen scavenging blend was made with 95 parts by weight PET and 5 parts by weight neat CHAA/CHMA (weight ratio=50/50) copolymer on a twin screw ZSK-30 extruder at 260–280° C. Thereafter, 90 parts by weight blend and 10 parts by weight PET-based cobalt masterbatch containing 0.5 wt % cobalt as cobalt oleate was mixed and made into a 2–3 mil thick clear monolayer film on a Randcastle film extruder at 260–270° C. A film sized 5 cm×20 cm (mass=0.714 g) was exposed to UV light of peak wavelength 254 nm for 10 min and then put in a sealed aluminum bag containing 300 cc nitrogen containing 1% $O_2$. The bag was kept at room temperature (20–28° C.). The head space oxygen level was monitored using a Mocon HS750. The head space oxygen level dropped from 1.15% to 1.07% after 72 hrs.

Example 16

Figure 5:
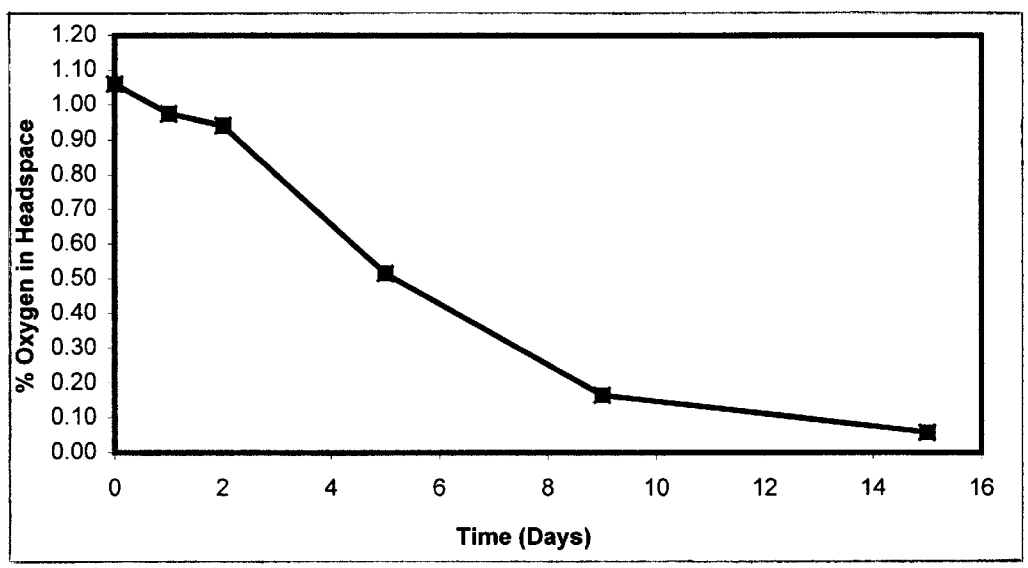
FIG. 5 shows the variation of the head space oxygen level with time for a film described in Example 16 placed in a sealed aluminum bag containing 300 cc nitrogen containing 1% $O_{02}$. The bag was kept at 4° C. The head space oxygen level was monitored using a Mocon HS750.

Oxygen Scavenging Study of 3-Layer Film Made from EMAC-Based Oxygen Scavenging Polymer Blend First, 60 parts by weight EMAC-2260, 30 parts by weight neat CHAA homopolymer, and 10 parts by weight EMAC-based cobalt masterbatch containing 1 wt % tribenzoyl triphenylbenzene (BBP$^3$) and 1 wt % cobalt as cobalt oleate were blended on a twin screw Haake extruder at 170° C. The blend was made into a 2 mil thick clear 3-layer film, with 0.5 mil thick polyethylene outlayers and 1 mil thick oxygen scavenging layer from the blend, on a Randcastle film extruder at 170° C. A film sized 5 cm×20 cm (mass=0.511 g) was exposed to UV with a peak wavelength of 254 nm and then put in a sealed aluminum bag containing 300 cc nitrogen containing 1% $O_2$. The bag was kept at 4° C. The head space oxygen level was monitored using a Mocon HS750. FIG. 5 shows the variation of the head space oxygen level with time.

Example 17

Figure 6:
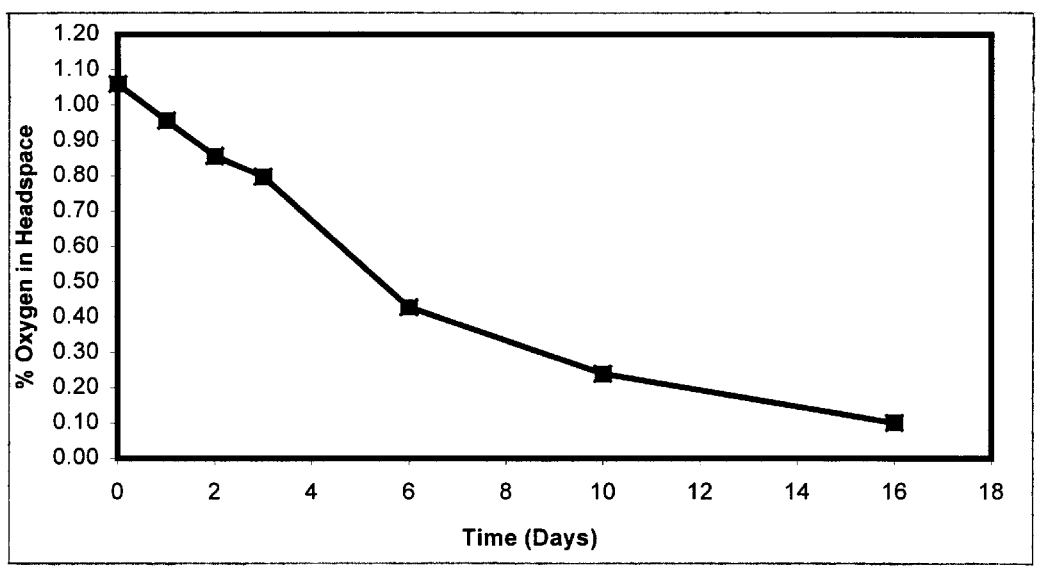
FIG. 6 shows the variation of the head space oxygen level with time for a film described in Example 17 placed in a sealed aluminum bag containing 300 cc nitrogen containing 1% $O_2$. The bag was kept at 4° C. The head space oxygen level was monitored using a Mocon HS750.

Oxygen Scavenging Study of 3-Layer Film Made from EMAC-based Oxygen Scavenging Polymer Blend Sixty parts by weight EMAC-2260, 30 parts by weight neat CHAA/MA (weight ratio=75/25) copolymer, and 10 parts by weight EMAC-based cobalt masterbatch containing 1 wt % BBP[3] and 1 wt % cobalt as cobalt oleate were blended on a twin screw Haake extruder at 170° C. The blend was made into 2 mil thick clear 3-layer film with 0.5 mil thick polyethylene outlayers and 1 mil thick oxygen scavenging layer from the blend on a Randcastle film extruder at 170° C. A film sized 5 cm×20 cm (mass=0.439 g) was exposed to UV light with a peak wavelength of 254 nm and put in a sealed aluminum bag containing 300 cc nitrogen containing 1% $O_2$. The bag was kept at 4° C. The head space oxygen level was monitored using a Mocon HS750. FIG. 6 shows the variation of the head space oxygen level with time.

Example 18

Figure 7:
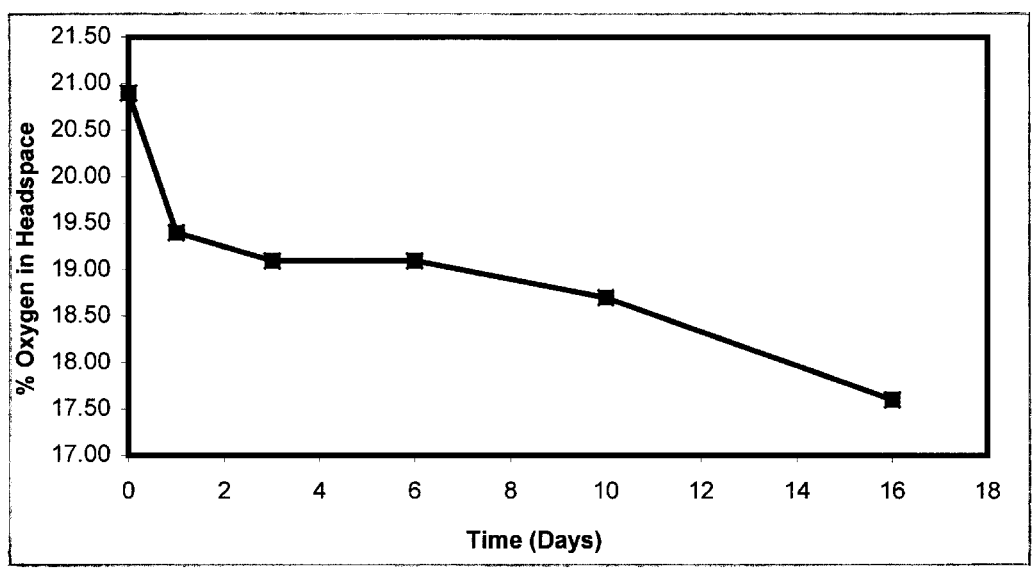
FIG. 7 shows the variation of the head space oxygen level with time for a film described in Example 18 placed in a sealed aluminum bag containing 300 cc air. The bag was kept at room temperature (20–28° C.). The head space oxygen level was monitored using a Mocon HS750.

Oxygen Scavenging Study of 3-Layer Film Made from EMAC-Based Oxygen Scavenging Polymer Blend Sixty parts by weight EMAC-2260, 30 parts by weight neat CHAA/MA (weight ratio=75/25) copolymer, and 10 parts by weight EMAC-based cobalt masterbatch containing 1 wt % BBP[3] and 1 wt % cobalt as cobalt oleate were blended on a twin screw Haake extruder at 170° C. The blend was made into 2 mil thick clear 3-layer film with 0.5 mil thick polyethylene outlayers and 1 mil thick oxygen scavenging layer from the blend on a Randcastle film extruder at 170° C. A film sized 5 cm×20 cm (mass=0.462 g) was exposed to UV light with a peak wavelength of 254 nm and put in a sealed aluminum bag containing 300 cc air. The bag was kept at room temperature (20–28° C.). The head space oxygen level was monitored using a Mocon HS750. FIG. 7 shows the variation of the head space oxygen level with time.

Example 19

Figure 8:
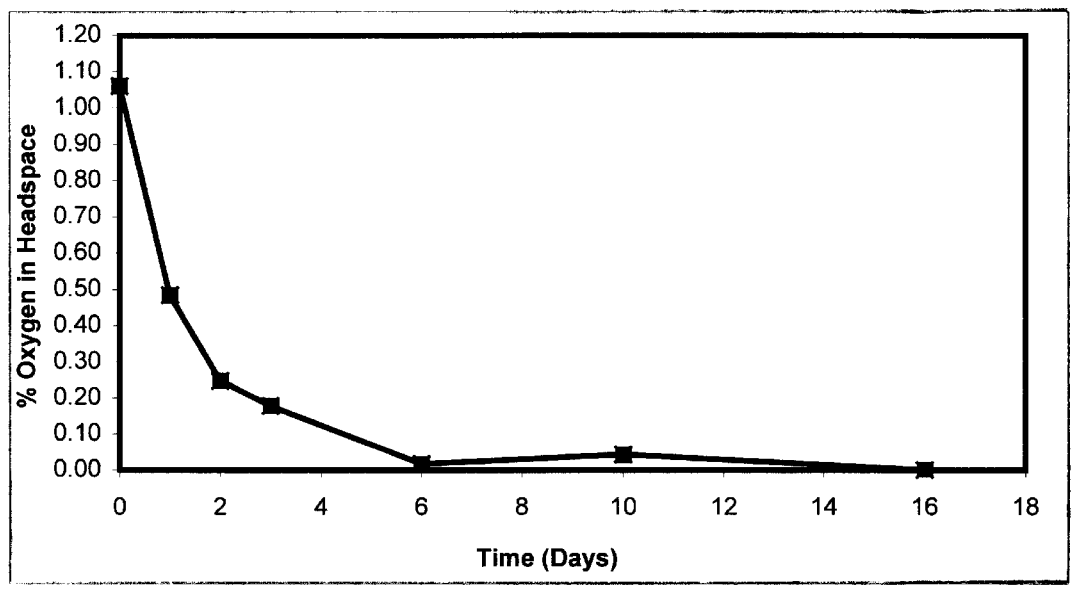
FIG. 8 shows the variation of the head space oxygen level with time for a film described in Example 19 placed in a sealed aluminum bag containing 300 cc nitrogen containing 1% $O_2$. The bag was kept at room temperature (20–28° C.). The head space oxygen level was monitored using a Mocon HS750.

Oxygen Scavenging Study of 3-Layer Film Made from EMAC-Based Oxygen Scavenging Polymer Blend Sixty parts by weight EMAC-2260, 30 parts by weight neat CHAA/MA (weight ratio=50/50) copolymer, and 10 parts by weight EMAC-based cobalt masterbatch containing 1 wt % BBP[3] and 1 wt % cobalt as cobalt oleate were blended on a twin screw Haake extruder at 170° C. The blend was made into 2 mil thick clear 3-layer film with 0.5 mil thick polyethylene outlayers and 1 mil thick oxygen scavenging layer from the blend on a Randcastle film extruder at 170° C. A film sized 5 cm×20 cm (mass=0.488 g) was exposed to UV light with a peak wavelength of 254 nm and put in a sealed aluminum bag containing 300 cc nitrogen containing 1% $O_2$. The bag was kept at room temperature (20–28° C.). The head space oxygen level was monitored using a Mocon HS750. FIG. 8 shows the variation of the head space oxygen level with time.

Example 20

Figure 9:
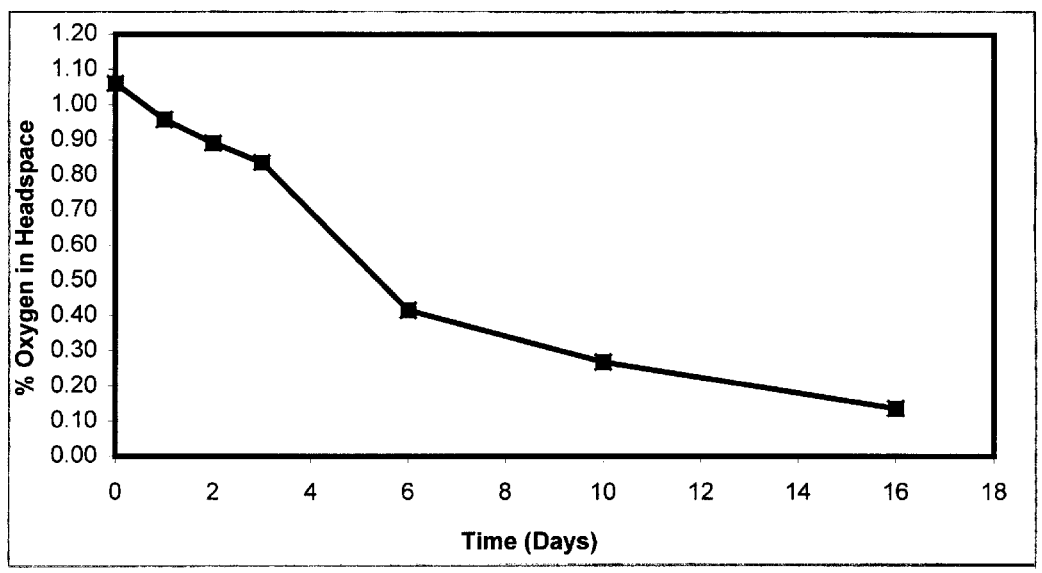
FIG. 9 shows the variation of the head space oxygen level with time for a film described in Example 20 placed in a sealed aluminum bag containing 300 cc nitrogen containing 1% $O_2$. The bag was kept at 4° C. The head space oxygen level was monitored using a Mocon HS750.

Oxygen Scavenging Study of 3-Layer Film Made from EMAC-Based Oxygen Scavenging Polymer Blend Sixty parts by weight EMAC-2260, 30 parts by weight neat CHAA/MA (weight ratio=50/50) copolymer, and 10 parts by weight EMAC-based cobalt masterbatch containing 1 wt % BBP[3] and 1 wt % cobalt as cobalt oleate were blended on a twin screw Haake extruder at 170° C. The blend was made into 2 mil thick clear 3-layer film with 0.5 mil thick polyethylene outlayers and 1 mil thick oxygen scavenging layer from the blend on a Randcastle film extruder at 170° C. A film sized 5 cm×20 cm (mass=0.475 g) was exposed to UV light with a peak wavelength of 254 nm and put in a sealed aluminum bag containing 300 cc nitrogen containing 1% 02. The bag was kept at 4° C. The head space oxygen level was monitored using a Mocon HS750. FIG. 9 shows the variation of the head space oxygen level with time.

Example 21

Figure 10:
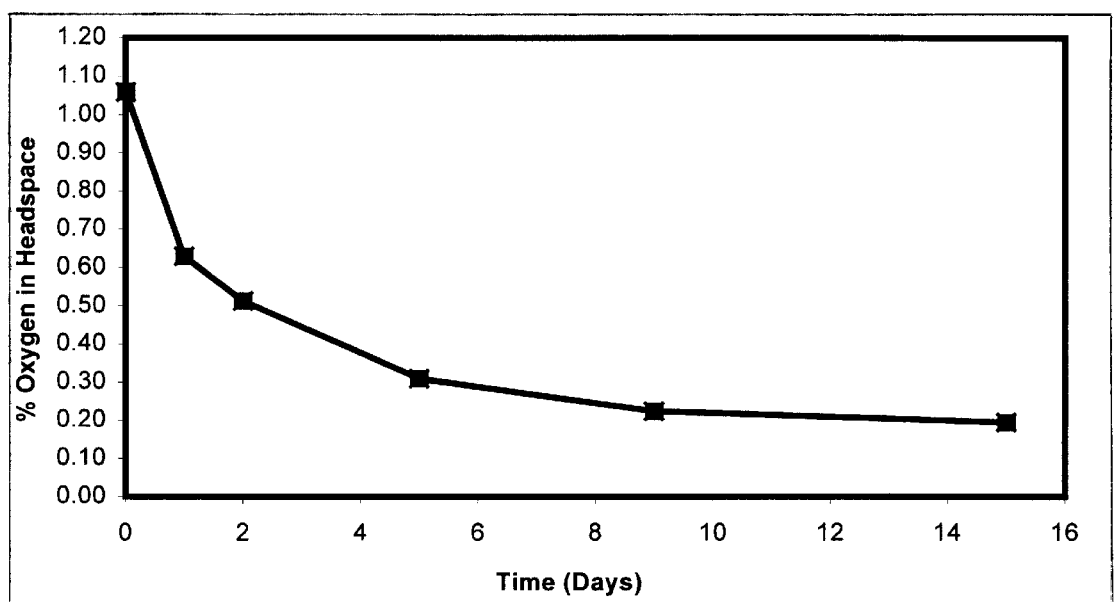
FIG. 10 shows the variation of the head space oxygen level with time for a film described in Example 21 placed in a sealed aluminum bag containing 300 cc nitrogen containing 1% $O_2$. The bag was kept at room temperature (20–28° C.). The head space oxygen level was monitored using a Mocon HS750.

Oxygen Scavenging Study of 3-Layer Film Made from EMAC-Based Oxygen Scavenging Polymer Blend Sixty parts by weight EMAC-2260, 30 parts by weight neat CHAA/MA (weight ratio=25/75) copolymer, and 10 parts by weight EMAC-based cobalt masterbatch containing 1 wt % BBP[3] and 1 wt % cobalt as cobalt oleate were blended on a twin screw Haake extruder at 170° C. The blend was made into 2 mil thick clear 3-layer film with 0.5 mil thick polyethylene outlayers and 1 mil thick oxygen scavenging layer from the blend on a Randcastle film extruder at 170° C. A film sized 5 cm×20 cm (mass=0.512 g) was exposed to UV light with a peak wavelength of 254 nm and put in a sealed aluminum bag containing 300 cc nitrogen containing 1% $O_2$. The bag was kept at room temperature (20–28° C.). The head space oxygen level was monitored using a Mocon HS750. FIG. 10 shows the variation of the head space oxygen level with time.

Example 22

Figure 11:
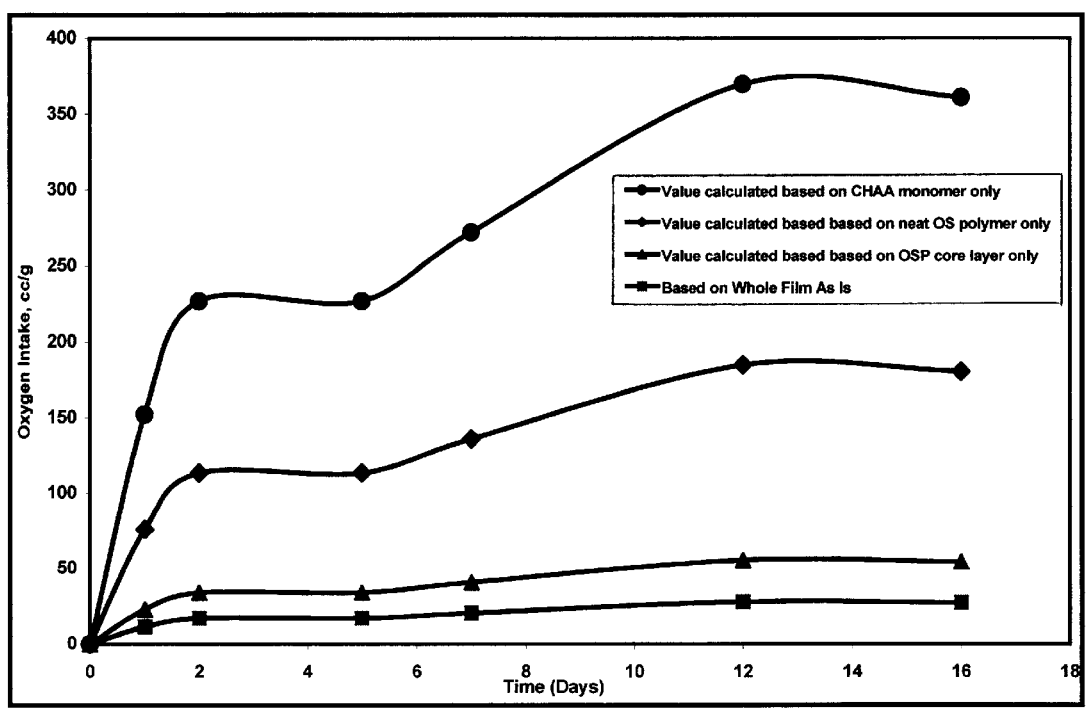
FIG. 11 shows the variation of the head space oxygen level with time for a film described in Example 22 placed in a sealed aluminum bag containing 300 cc air. The bag was kept at room temperature (20–28° C.). The head space oxygen level was monitored using a Mocon HS750.

Oxygen Scavenging Study of 3-Layer Film Made from PE-Based Oxygen Scavenging Polymer Blend Sixty parts by weight polyethylene, 30 parts by weight neat CHAA/MA (weight ratio=50/50) copolymer, and 10 parts by weight EMAC-based cobalt masterbatch containing 1 wt % BBP[3] and 1 wt % cobalt as cobalt oleate were blended on a twin screw Haake extruder at 170° C. The blend was made into a 2 mil thick clear 3-layer film with 0.5 mil thick polyethylene outlayers and a 1 mil thick oxygen scavenging layer on a Randcastle film extruder at 170° C. A film sized 5 cm×20 cm (mass=0.406 g) was exposed to UV light with a peak wavelength of 254 nm and put in a sealed aluminum bag containing 300 cc air. The bag was kept at room temperature (20–28° C.). The head space oxygen level was monitored using a Mocon HS750. FIG. 11 shows the variation of the oxygen absorbed with time.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A composition, comprising:

a branched oxygen scavenging polymer comprising structure II:

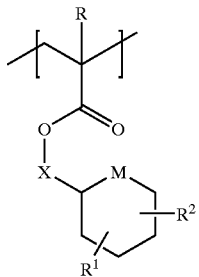

(II)

wherein $R^1$ and $R^2$ are each selected from —H, —CH$_3$, or a monomeric unit of a polymer wherein the monomeric unit comprises an ethylenic backbone and a cyclic hydrocarbon pendant group, provided at least one of $R^1$ and $R^2$ is the monomeric unit and each bond to a monomeric unit is to an atom of the cyclic hydrocarbon pendant group of the monomeric unit; M is —(CR$^3{}_2$)$_n$—, wherein n is an integer from 0 to 4, inclusive; X is null or a linking group selected from —O—(CHR$^4$)$_y$—; —(C=O)—O—(CHR$^4$)$_y$—; —NH—(CHR$^4$)$_y$—; —O—(C=O)—(CHR$^4$)$_y$—; —(C=O)—NH—(CHR$^4$)$_y$—; or —(C=O)—O—CHOH—CH$_2$—O—, wherein $R^4$ is hydrogen, methyl, ethyl, propyl, or butyl; and y is an integer from 1 to 18, inclusive; and each $R^3$ is independently selected from —H or —CH$_3$, and a second polymer.

2. The composition of claim 1, wherein the branched oxygen scavenging polymer further comprises an ethylenic backbone and a pendant or terminal cyclic olefinic group with structure I:

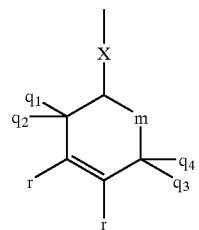

(I)

wherein $q_1$, $q_2$, $q_3$, $q_4$, and r are independently selected from hydrogen, methyl, or ethyl; m is —(CH$_2$)$_n$—, wherein n is an integer from 0 to 4, inclusive; X is null or a linking group; and, when r is hydrogen, at least one of $q_1$, $q_2$, $q_3$, and $q_4$ is also hydrogen.

3. The composition of claim 1, wherein the second polymer is selected from co(ethylene/methyl acrylate) (EMAC), co(ethylene/vinyl acetate) (EVA), polyethylene (PE), polypropylene (PP), polystyrene (PS), polyethylene terephthalate (PET), polyamides, or co(ethylene/vinyl alcohol) (EVOH).

4. The composition of claim 1, wherein the weight ratio of the oxygen scavenging polymer to the second polymer is from about 1:9 to about 9:1.

5. The composition of claim 1, further comprising a compatibilizer.

6. The composition of claim 1, further comprising a flow agent.

7. A method of preparing a neat oxygen scavenging polymer, comprising:

providing an emulsion comprising the oxygen scavenging polymer, water, and a surfactant;

combining the emulsion with an organic solvent, to precipitate the oxygen scavenging polymer;

separating the precipitated oxygen scavenging polymer from the organic solvent; and, drying the precipitated oxygen scavenging polymer, to produce the neat oxygen scavenging polymer, wherein the oxygen scavenging polymer comprises structure II:

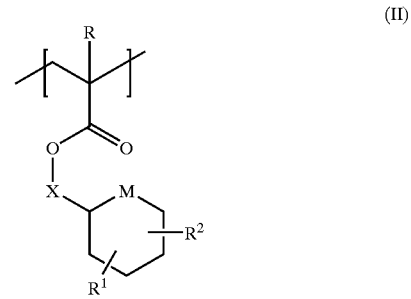

(II)

wherein $R^1$ and $R^2$ are each selected from —H, —CH$_3$, or a monomeric unit of a polymer wherein the monomeric unit comprises an ethylenic backbone and a cyclic hydrocarbon pendant group, provided at least one of $R^1$ and $R^2$ is the monomeric unit and each bond to a monomeric unit is to an atom of the cyclic hydrocarbon pendant group of the monomeric unit; M is —(CR$^3{}_2$)$_n$—, wherein n is an integer from 0 to 4, inclusive; X is null or a linking group selected from —O—(CHR$^4$)$_y$—; —(C=O)—O—(CHR$^4$)$_y$—; —NH—(CHR$^4$)$_y$—; —O—(C=O)—(CHR$^4$)$_y$—; —(C=O)—NH—(CHR$^4$)$_y$—; or —(C=O)—CHOH—CH$_2$—O—, wherein $R^4$ is hydrogen, methyl, ethyl, propyl, or butyl; and y is an integer from 1 to 18, inclusive; and each $R^3$ is independently selected from —H or —CH$_3$.

8. The method of claim 7, wherein the oxygen scavenging polymer comprises an ethylenic backbone and a pendant or terminal cyclic olefinic group with structure I:

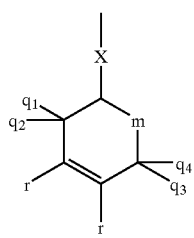

(I)

wherein $q_1$, $q_2$, $q_3$, $q_4$, and r are independently selected from hydrogen, methyl, or ethyl; m is $-(CH_2)_n-$, wherein n is an integer from 0 to 4, inclusive; X is null or a linking group; and, when r is hydrogen, at least one of $q_1$, $q_2$, $q_3$, and $q_4$ is also hydrogen.

9. The method of claim 7, wherein the emulsion is substantially free of organic solvent.

10. The method of claim 7, wherein the emulsion comprises from about 5 wt % to about 65 wt % oxygen scavenging polymer.

11. The method of claim 7, wherein the organic solvent is isopropanol.

12. The method of claim 7, wherein the weight ratio of emulsion to organic solvent is between about 1:9 to about 9:1.

13. The method of claim 7, wherein the drying is performed under vacuum at from about 30° C. to about 80° C.

14. The method of claim 7, further comprising extruding the neat oxygen scavenging polymer.

15. A method of preparing a neat oxygen scavenging polymer, comprising:
providing an emulsion comprising the oxygen scavenging polymer, water, and a surfactant;
cooling the emulsion to less than about 0° C., to precipitate the oxygen scavenging polymer;
separating the precipitated oxygen scavenging polymer from the emulsion; and,
drying the precipitated oxygen scavenging polymer, to produce the neat oxygen scavenging polymer, wherein the oxygen scavenging polymer comprises structure II:

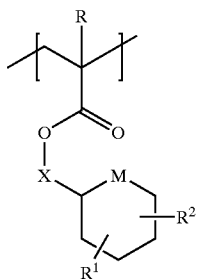

(II)

wherein $R^1$ and $R^2$ are each selected from $-H$, $-CH_3$, or a monomeric unit of a polymer wherein the monomeric unit comprises an ethylenic backbone and a cyclic hydrocarbon pendant group, provided at least one of $R^1$ and $R^2$ is the monomeric unit and each bond to a monomeric unit is to an atom of the cyclic hydrocarbon pendant group of the monomeric unit; M is $-(CR^3_2)_n-$, wherein n is an integer from 0 to 4, inclusive; X is null or a linking group selected from $-O-(CHR^4)_y-$; $-(C=O)-O-(CHR^4)_y-$; $-NH-(CHR^4)_y-$; $-O-(C=O)-(CHR^4)_y-$; $-(C=O)-NH-(CHR^4)_y-$; or $-(C=O)-O-CHOH-CH_2-O-$, wherein $R^4$ is hydrogen, methyl, ethyl, propyl, or butyl; and y is an integer from 1 to 18, inclusive; and each $R^3$ is independently selected from $-H$ or $-CH_3$.

16. The method of claim 15, wherein the oxygen scavenging polymer comprises an ethylenic backbone and a pendant or terminal cyclic olefinic group with structure I:

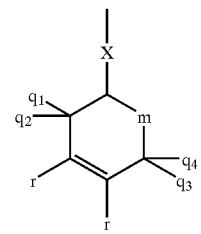

(I)

wherein $q_1$, $q_2$, $q_3$, $q_4$, and r are independently selected from hydrogen, methyl, or ethyl; m is $-(CH_2)_n-$, wherein n is an integer from 0 to 4, inclusive; X is null or a linking group; and, when r is hydrogen, at least one of $q_1$, $q_2$, $q_3$, and $q_4$ is also hydrogen.

17. The method of claim 15, wherein the emulsion is substantially free of organic solvent.

18. The method of claim 15, wherein the emulsion comprises from about 5 wt % to about 65 wt % oxygen scavenging polymer.

19. The method of claim 15, wherein the cooling is to between about −10° C. and about −5° C.

20. The method of claim 15, wherein the drying is performed under vacuum at from about 30° C. to about 80° C.

21. The method of claim 15, further comprising extruding the neat oxygen scavenging polymer.

22. A method of preparing a neat oxygen scavenging polymer, comprising:
providing an emulsion comprising the oxygen scavenging polymer, water, and a surfactant;
contacting the emulsion wit an aqueous dilute strong add solution, to precipitate the oxygen scavenging polymer;
separating the precipitated oxygen scavenging polymer from the solution; and,
drying the precipitated oxygen scavenging polymer, to produce the neat oxygen scavenging polymer, wherein the oxygen scavenging polymer comprises structure II:

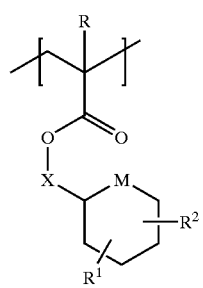

(II)

wherein $R^1$ and $R^2$ are each selected from —H, —$CH_3$, or a monomeric unit of a polymer wherein the monomeric unit comprises an ethylenic backbone and a cyclic hydrocarbon pendant group, provided at least one of $R^1$ and $R^2$ is the monomeric unit and each bond to a monomeric unit is to an atom of the cyclic hydrocarbon pendant group of the monomeric unit; M is —$(CR^3{}_2)_n$—, wherein n is an integer from 0 to 4, inclusive; X is null or a linking group selected from —O—$(CHR^4)_y$—; —(C═O)—O—$(CHR^4)_y$; —NH—$(CHR^4)_y$—; —O—(C═O)—$(CHR^4)_y$—; —(C═O)—NH—$(CHR^4)_y$—; or —(C═O)—O—CHOH—$CH_2$—O—, wherein $R^4$ is hydrogen, methyl, ethyl, propyl, or butyl; and y is an integer from 1 to 18, inclusive; and each $R^3$ is independently selected from —H or —$CH_3$.

23. The method of claim 22, wherein the oxygen scavenging polymer comprises an ethylenic backbone and a pendant or terminal cyclic olefinic group with structure I:

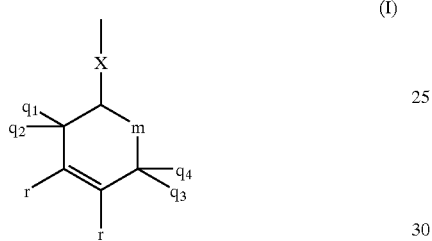

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive; X is null or a linking group; and, when r is hydrogen, at least one of $q_1$, $q_2$, $q_3$, and $q_4$ is also hydrogen.

24. The method of claim 22, wherein the emulsion is substantially free of organic solvent.

25. The method of claim 22, wherein the emulsion comprises from about 5 wt % to about 65 wt % oxygen scavenging polymer.

26. The method of claim 22, wherein the aqueous dilute strong acid solution comprises between about 1 wt % and about 2 wt % strong acid.

27. The method of claim 26, wherein the strong acid is selected from HCl or $H_2SO_4$.

28. The method of claim 22, wherein the weight ratio of emulsion to aqueous dilute strong acid solution is between about 1:5 to about 5:1.

29. The method of claim 22, wherein the drying is performed under vacuum at from about 30° C. to about 80° C.

30. The method of claim 22, further comprising extruding the neat oxygen scavenging polymer.

31. A method of preparing a neat oxygen scavenging polymer, comprising:
  providing an emulsion comprising the oxygen scavenging polymer, water, and a surfactant; and,
  spray-drying the oxygen scavenging polymer under vacuum at a temperature between about 80° C. and about 100° C., to produce the neat oxygen scavenging polymer, wherein the oxygen scavenging polymer comprises structure II:

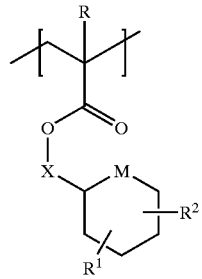

(II)

wherein $R^1$ and $R^2$ are each selected from —H, —$CH_3$, or a monomeric unit of a polymer wherein the monomeric unit comprises an ethylenic backbone and a cyclic hydrocarbon pendant group, provided at least one of $R^1$ and $R^2$ is the monomeric unit and each bond to a monomeric unit is to an atom of the cyclic hydrocarbon pendant group of the monomeric unit; M is —$CR^3{}_2)_n$—, wherein n is an integer from 0 to 4, inclusive; X is null or a linking group selected from —O—$(CHR^4)_y$—; —(C═O)—O—$(CHR^4)_y$—; —NH—$(CHR^4)_y$—; —O—(C═O)—$(CHR^4)_y$—; —C═O)—NH—$(CHR^4)_y$—; or —(C═O)—O—CHOH—$CH_2$—O—, wherein $R^4$ is hydrogen, methyl, ethyl, propyl, or butyl; and y is an integer from 1 to 18, inclusive; and each $R^3$ is independently selected from —H or —$CH_3$.

32. The method of claim 31, wherein the oxygen scavenging polymer comprises an ethylenic backbone and a pendant or terminal cyclic olefinic group with structure I:

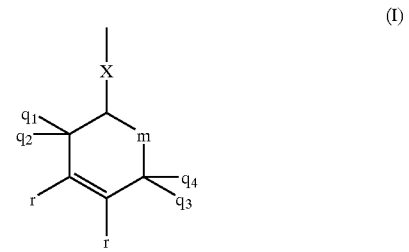

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive; X is null or a linking group; and, when r is hydrogen, at least one of $q_1$, $q_2$, $q_3$, and $q_4$ is also hydrogen.

33. The method of claim 31, wherein the emulsion is substantially free of organic solvent.

34. The method of claim 31, wherein the emulsion comprises from about 5 wt % to about 65 wt % oxygen scavenging polymer.

35. The method of claim 31, further comprising extruding the neat oxygen scavenging polymer.

36. A method of preparing a composition comprising an oxygen scavenging polymer and a second polymer, the method comprising:
  providing (i) the oxygen scavenging polymer in neat form, wherein the oxygen scavenging polymer comprises structure II:

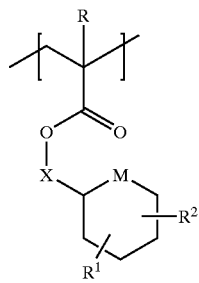

(II)

wherein $R^1$ and $R^2$ are each selected from —H, —CH$_3$, or a monomeric unit of a polymer wherein the monomeric unit comprises an ethylenic backbone and a cyclic hydrocarbon pendant group, provided at least one of $R^1$ and $R^2$ is the monomeric unit and each bond to a monomeric unit is to an atom of the cyclic hydrocarbon pendant group of the monomeric unit; M is —(CR$^3_2$)$_n$—, wherein n is an integer from 0 to 4, inclusive; X is null or a linking group selected from —O—(CHR$^4$)$_y$—; —(C=O)—O—(CHR$^4$)$_y$—; —NH—(CHR$^4$)$_y$—; —O—(C=O)—(CHR$^4$)$_y$—; —(C=O)—NH—(CHR$^4$)$_y$—; or —(C=O)—O—CHOH—CH$_2$—O—, wherein R$^4$ is hydrogen, methyl, ethyl, propyl, or butyl; and y is an integer from 1 to 18, inclusive; and each R$^3$ is independently selected from —H or —CH$_3$ and (ii) the second polymer; and, blending the oxygen scavenging polymer in neat form and the second polymer, to form the composition.

37. The method of claim 36, wherein the oxygen scavenging polymer further comprises an ethylenic backbone and a pendant or terminal cyclic olefinic group with structure I:

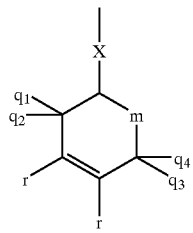

(I)

wherein $q_1$, $q_2$, $q_3$, $q_4$, and r are independently selected from hydrogen, methyl, or ethyl; m is —(CH$_2$)$_n$—, wherein n is an integer from 0 to 4, inclusive; X is null or a linking group; and, when r is hydrogen, at least one of $q_1$, $q_2$, $q_3$, and $q_4$ is also hydrogen.

38. The method of claim 36, wherein the second polymer is selected from co(ethylene/methyl acrylate) (EMAC), co(ethylene/vinyl acetate) (EVA), polyethylene (PE), polypropylene (PP), polystyrene (PS), polyethylene terephthalate (PET), polyamides, or co(ethylene/vinyl alcohol) (EVOH).

39. The method of claim 36, wherein the weight ratio of the oxygen scavenging polymer to the second polymer is from about 1:9 to about 9:1.

40. The method of claim 36, wherein the composition further comprises at least one additive selected from a compatibilizer or a flow agent.

41. The method of claim 36, wherein during the blending the oxygen scavenging polymer and the second polymer are melted at from about 120° C. to about 280° C.

42. The method of claim 41, wherein the blending further comprises extruding the oxygen scavenging polymer and the second polymer after melting.

43. An oxygen scavenging packaging article, comprising:
an oxygen scavenging layer comprising (a) a branched oxygen scavenging polymer comprising structure II:

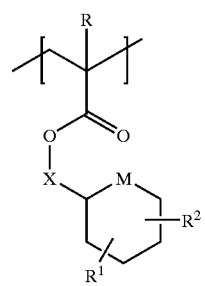

(II)

wherein $R^1$ and $R^2$ are each selected from —H, —CH$_3$, or a monomeric unit of a polymer wherein the monomeric unit comprises an ethylenic backbone and a cyclic hydrocarbon pendant group, provided at least one of $R^1$ and $R^2$ is the monomeric unit and each bond to a monomeric unit is to an atom of the cyclic hydrocarbon pendant group of the monomeric unit; M is —(CR$^3_2$)$_n$—, wherein n is an integer from 0 to 4, inclusive; X is null or a linking group selected from —O—(CHR$^4$)$_y$—; —(C=O)—O—(CHR$^4$)$_y$—; —NH—(CHR$^4$)$_y$—; —O—(C=O)—(CHR$^4$)$_y$—; —(C=O)—NH—(CHR$^4$)$_y$—; or —(C=O)—O—CHOH—CH$_2$—O—, wherein R$^4$ is hydrogen, methyl, ethyl, propyl, or butyl; and y is an integer from 1 to 18, inclusive; and each R$^3$ is independently selected from —H or —CH$_3$; and (b) a second polymer.

44. The packaging article of claim 43, wherein the branched oxygen scavenging polymer further comprises an ethylenic backbone and a pendant or terminal cyclic olefinic group with structure I:

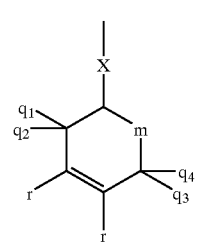

(I)

wherein $q_1$, $q_2$, $q_3$, $q_4$, and r are independently selected from hydrogen, methyl, or ethyl; m is —(CH$_2$)$_n$—, wherein n is an integer from 0 to 4, inclusive; X is null or a linking group; and, when r is hydrogen, at least one of $q_1$, $q_2$, $q_3$, and $q_4$ is also hydrogen.

45. The packaging article of claim 44, wherein $q_1$, $q_2$, $q_3$, $q_4$, and r are each hydrogen and n is 1.

46. The packaging article of claim 44, wherein X is a linking group selected from:
—O—(CHR$^4$)$_y$—; —(C=O)—O—(CHR$^4$)$_y$—; —NH—(CHR$^4$)$_y$—; —O—(C=O)—(CHR$^4$)$_y$—; —(C=O)—NH—(CHR$^4$)$_y$—; or —(C=O)—O—CHOH—CH$_2$—O— wherein $R^4$ is hydrogen, methyl, ethyl, propyl, or butyl; and y is an integer from 1 to 18, inclusive.

47. The packaging article of claim 43, wherein the polymer comprises cyclohexenylmethyl acrylate (CHAA) units or cyclohexenylmethyl methacrylate (CHMA) units.

48. The packaging article of claim 43, wherein the second polymer is selected from co(ethylene/methyl acrylate) (EMAC), co(ethylene/vinyl acetate) (EVA), polyethylene (PE), polypropylene (PP), polystyrene (PS), polyethylene terephthalate (PET), polyamides, or co(ethylene/vinyl alcohol) (EVOH).

49. The packaging article of claim 43, further comprising a structural layer comprising a structural material selected from polyethylene, low density polyethylene, very low density polyethylene, ultra-low density polyethylene, high density polyethylene, polyethylene terephthalate (PET), polyvinyl chloride, ethylene-vinyl acetate, ethylene-alkyl (meth)acrylates, ethylene-(meth)acrylic acid, ethylene-(meth)acrylic acid ionomers, silica, metal foil, glass, paperboard, or cardboard.

50. The packaging article of claim 43, further comprising an oxygen barrier layer comprising an oxygen barrier material selected from selected from vinyl alcohol polymers, polyesters, vinylidene dichloride polymers, epoxy polymers, sulfone polymers, acrylonitrile polymers, isocyanate polymers, polyamides, silica, or metal foil.

* * * * *

UNITED STATES PATENT AND TRADEMARK OFFICE
CERTIFICATE OF CORRECTION

PATENT NO. : 6,559,205 B2
DATED : May 6, 2003
INVENTOR(S) : Gangfeng Cai, Ta Yen Ching and Hu Yang It is certified that error appears in the above-identified patent and that said Letters Patent is hereby corrected as shown below:

<u>Column 24,</u>
Lines 60-61, delete "–(C=O)–CHOH–CH$_2$–O–" and insert
-- –(C=O)–O–CHOH–CH$_2$–O– --.

<u>Column 26,</u>
Line 46, delete "wit" and insert -- with --.
Line 46, delete "add" and insert -- acid --.

<u>Column 27,</u>
Line 11, delete "–(C=O)–O–(CHR$^4$)$_y$" and insert -- –(C=O)–O–(CHR$^4$)$_y$– --.

<u>Column 28,</u>
Line 22, delete "–CR$^3{}_2$)$_n$–" and insert -- –(CR$^3{}_2$)$_n$– --.
Line 26, delete "–C=O)–NH–(CHR$^4$)$_y$–" and insert -- –(C=O)–NH–(CH$^4$)$_y$– --.

<u>Column 30,</u>
Line 26, delete "or" and insert -- of --.

Signed and Sealed this

Twenty-third Day of September, 2003

JAMES E. ROGAN
*Director of the United States Patent and Trademark Office*